(12) United States Patent
Nagashima et al.

(10) Patent No.: US 10,846,837 B2
(45) Date of Patent: Nov. 24, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Takayuki Nagashima, Yokohama (JP); Tadayuki Ito, Yokohama (JP); Yutaka Murata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 16/122,208

(22) Filed: Sep. 5, 2018

(65) Prior Publication Data
US 2019/0005633 A1    Jan. 3, 2019

Related U.S. Application Data

(63) Continuation of application No. PCT/JP2017/003573, filed on Feb. 1, 2017.

(30) Foreign Application Priority Data

Mar. 10, 2016 (JP) ................................. 2016-047606

(51) Int. Cl.
*G06K 9/36* (2006.01)
*G06T 5/50* (2006.01)
(Continued)

(52) U.S. Cl.
CPC ............... *G06T 5/50* (2013.01); *H04N 5/14* (2013.01); *H04N 5/232* (2013.01);
(Continued)

(58) Field of Classification Search
None
See application file for complete search history.

(56) References Cited

U.S. PATENT DOCUMENTS 4,665,433 A * 5/1987 Hinson ................ H04N 5/2628
348/580
2010/0265353 A1   10/2010 Koyama
(Continued)

FOREIGN PATENT DOCUMENTS

JP     2010-268441 A    11/2010
JP     2012-151638 A     8/2012
(Continued)

OTHER PUBLICATIONS

International Search Report for PCT/JP2017/003573, Japanese Patent Office, dated May 9, 2017.

*Primary Examiner* — Sean M Conner
(74) *Attorney, Agent, or Firm* — Canon U.S.A., Inc. IP Division

(57) ABSTRACT

An image processing apparatus includes: a filter unit configured to execute a filter process on each block area in the input image and output the filter processing result of each pixel in the input image; a supply unit configured to read out attribute information from the attribute map and supply attribute information for each pixel; and an image processing unit configured to perform the predetermined image processing for the filter processing result output by the filter unit based on the attribute information for each pixel supplied by the supply unit, wherein the pixel order in which the pixel value in the input image is received by the filter processing unit and the pixel order in which the filter processing unit outputs the filter processing result are different, and wherein the supply unit supplies the attribute information for each pixel according to the pixel order of the filter processing result.

12 Claims, 26 Drawing Sheets

(51) Int. Cl.
*H04N 5/232* (2006.01)
*H04N 5/14* (2006.01)
*H04N 5/351* (2011.01)
*H04N 5/235* (2006.01)

(52) U.S. Cl.
CPC ....... *H04N 5/2355* (2013.01); *H04N 5/23267* (2013.01); *H04N 5/351* (2013.01); *G06T 2207/10144* (2013.01); *G06T 2207/20208* (2013.01); *G06T 2207/20224* (2013.01)

(56) References Cited

U.S. PATENT DOCUMENTS

| | | |
|---|---|---|
| 2012/0182321 A1 | 7/2012 | Kondo |
| 2015/0054986 A1 | 2/2015 | Tanaka |

FOREIGN PATENT DOCUMENTS

| | | |
|---|---|---|
| JP | 2014-039169 A | 2/2014 |
| JP | 2014-154982 A | 8/2014 |
| JP | 2015-043495 A | 3/2015 |

\* cited by examiner

| 0 | 2 | 4 | ················ | 126 |
| 128 | 130 | 132 | ················ | 254 |
| | | | | |
| 8064 | 8066 | 8068 | ················ | 8190 |

702

| 1 | 3 | 5 | ················ | 127 |
| 11 | 13 | 15 | ················ | 255 |
| | | | | |
| 8065 | 8067 | 8069 | ················ | 8191 |

FIG.6

| 801 |
|---|
| NUMBER OF RECTANGLES IN WIDTH DIRECTION |
| NUMBER OF RECTANGLES IN HEIGHT DIRECTION |
| WIDTH OF LEFT-END RECTANGLE |
| WIDTH OF MIDDLE RECTANGLE |
| WIDTH OF RIGHT-END RECTANGLE |
| HEIGHT OF UPPER-END RECTANGLE |
| HEIGHT OF MIDDLE RECTANGLE |
| HEIGHT OF LOWER-END RECTANGLE |
| FIRST ATTRIBUTE MAP ENABLEMENT |
| FIRST ATTRIBUTE MAP GEOMETRIC TRANSFORMATION PARAMETER |
| FIRST ATTRIBUTE MAP ADDRESS |
| SECOND ATTRIBUTE MAP ENABLEMENT |
| SECOND ATTRIBUTE MAP GEOMETRIC TRANSFORMATION PARAMETER |
| SECOND ATTRIBUTE MAP ADDRESS |

FIG.7B

MOTION VECTOR
(MOVING SUBJECT + CHANGE IN CAMERA ORIENTATION)

MOTION VECTOR
(MOVING SUBJECT)

MOVING AREA MAP

MOVING AREA MAP

GEOMETRIC TRANSFORMATION AMOUNT

MOVING AREA MAP
AFTER GEOMETRIC TRANSFORMATION

IMAGE PROCESSING APPARATUS, IMAGE PROCESSING METHOD, AND STORAGE MEDIUM

CROSS-REFERENCE TO RELATED APPLICATIONS

This application is a Continuation of International Patent Application No. PCT/JP2017/003573, which was filed on Feb. 1, 2017 and which claims priority to Japanese Patent Application No. 2016-047606, which was filed on Mar. 10, 2016, both of which are hereby incorporated by reference herein in their entirety.

BACKGROUND

Field of the Disclosure

The present disclosure relates to an image processing apparatus, an image processing method, and a storage medium for combining a plurality of images by referring to attribute information.

Description of the Related Art

For image processing such as image combining, a method has been known which involves referring to an attribute map indicating pixels' attributes, and changing an algorithm or parameter to be applied for each pixel in accordance with the pixel's attribute. For example, an image processing apparatus described in PTL 1 calculates the degree of blur based on a distance map and performs a blurring process so as to obtain the degree of blur as calculated for each area. Also, in image combining or the like, a block area of a desired size is used as the unit of processing in such a case to lower the cost. In such a case, input images to be processed (hereinafter, referred to as "processing target images") are each divided into block areas of a desired size and processed on a block area basis. Also, in such a case, the pixel values corresponding to each block area are referred to from the attribute map. Further, in image combining or the like, a filter process is performed as preprocessing in such a case. For example, to smooth images, a filter process is sometimes performed which involves calculating the average of the pixel values of each small rectangle centered at a pixel of interest and outputting the calculated average as the pixel value of the pixel of interest. In the case of applying such a filter process sequentially to block areas obtained by dividing a processing target image, the pixel values of some pixels, which are dependent on the filter size (the size of the small rectangle mentioned above), remain undetermined until the pixels of an adjacent block area are referred to. Consequently, the sizes of some block areas after the filter process may sometimes change depending on the positions of the block areas within the processing target images. In this case, the pixels in the block areas after the filter process and the pixels referred to in the attribute map do not correspond to each other. This leads to a problem that the algorithm or parameter to be applied in the image combining or the like cannot be properly changed.

Thus, to prevent changes in the sizes of some block areas after the filter process, one of the following methods is used. The first method is a method involving enlarging the block areas to be input into the filter process and making adjacent block areas overlap each other. The second method is a method that involves providing a memory for a plurality of lines to buffer pixels after the filter process. However, performing the filter process on block areas overlapping each other involves transferring a large number of pixels that do not match the unit of access for the system bus and memory. This may possibly lower the data transfer efficiency and lower the image processing performance. Also, providing a line buffer at a stage following the filter process may possibly increase the product cost. Such problems are more severe for systems that process higher-definition images. It is therefore not always ideal to employ methods as above.

Also, even in the case of not performing the block division or the filter process as preprocessing in image combining or the like, the above problems still occur if geometric transformation for removing distortion due to vibration, such as camera shake, is performed on the processing target images. This is because the pixels in the processing target image after the geometric transformation and the pixels in the attribute map do not correspond to each other.

As described above, in image combining or the like performed based on an attribute map, the processing target images and the attribute map do not correspond to each other in such a case due to processing performed at a preceding stage.

CITATION LIST

Patent Literature

PTL 1: Japanese Patent Laid-Open No. 2015-043495

SUMMARY

In view of the foregoing, an aspect of some of the embodiments that are described herein is to, in the case where image processing based on an attribute map is applied to an input image, enable the image processing based on the attribute map to be properly applied to the input image even if correspondence is lost between the pixels in the input image and the pixels in the attribute map due to processing performed at a preceding stage of the image processing.

An image processing apparatus according to some embodiments is an image processing apparatus for performing a predetermined image processing for an input image based on an attribute map, including: a filter unit configured to execute a filter process on each of block areas in the input image and output the filter processing result of each pixel in the input image; a supply unit configured to read out attribute information from the attribute map and supply attribute information for each pixels; and an image processing unit configured to perform the predetermined image processing for the filter processing result output by the filter unit based on the attribute information for each pixel supplied by the supply unit, wherein the pixel order in which the pixel value in the input image is received by the filter processing unit and the pixel order in which the filter processing unit outputs the filter processing result are different, wherein the supply unit supplies the attribute information for each pixel according to the pixel order in which the filter processing unit outputs the filter processing result.

Also, an image processing apparatus according to some embodiments includes: a filter unit configured to execute a filter process on each of the block areas obtained by dividing an input image into a predetermined size; a supply unit configured to, based on a position and size of the block area on which the filter process has been executed within the entire image, read out and supply pixel values corresponding to the block area from an attribute map indicating an attribute of each pixel in the input image; and an image correction unit configured to perform correction on the block area on which the filter process has been executed based on the pixel values corresponding to the block area, which are supplied from the supply unit.

Also, an image processing apparatus according to some embodiments includes: a filter unit configured to execute a filter process on each of the block areas obtained by dividing an input image into a predetermined size; a supply unit configured to, based on a position and size of the block area on which the filter process has been executed within the entire image, read out and supply pixel values corresponding to the block area from the input image before the filter process; and an image combining unit configured to generate new pixel values of the block area on which the filter process has been executed from pixel values of the block area on which the filter process has been executed and the pixel values corresponding to the block area, which are supplied from the supply unit.

Also, an image processing apparatus according to some embodiments includes: an image geometric transformation unit configured to geometrically transform an input image based on a geometric transformation parameter; an attribute generation unit configured to generate an attribute map indicating an attribute of each of the pixels in the input image; an attribute map geometric transformation unit configured to geometrically transform the attribute map based on the geometric transformation parameter; and an image processing unit configured to execute image processing on the geometrically transformed input image based on the geometrically transformed attribute map.

Further features of the embodiments will become apparent from the following description of exemplary embodiments with reference to the attached drawings.

BRIEF DESCRIPTION OF THE DRAWINGS

FIG. 3 is a diagram illustrating a processing target image divided into rectangular areas of a desired size;

FIG. 4 is a diagram illustrating rectangular areas in a processing target image after a filter process;

FIG. 6 is a diagram illustrating the order of pixels to be supplied in the case where images are combined;

FIG. 7B is a diagram illustrating an example of parameters held in a register in a case where there are two types of attribute information;

DESCRIPTION OF THE EMBODIMENTS

Some embodiments will be described below with reference to the drawings. Note that the configurations that are presented below are examples, and not all embodiments are limited to the illustrated configurations.

First Embodiment

Figure 1:
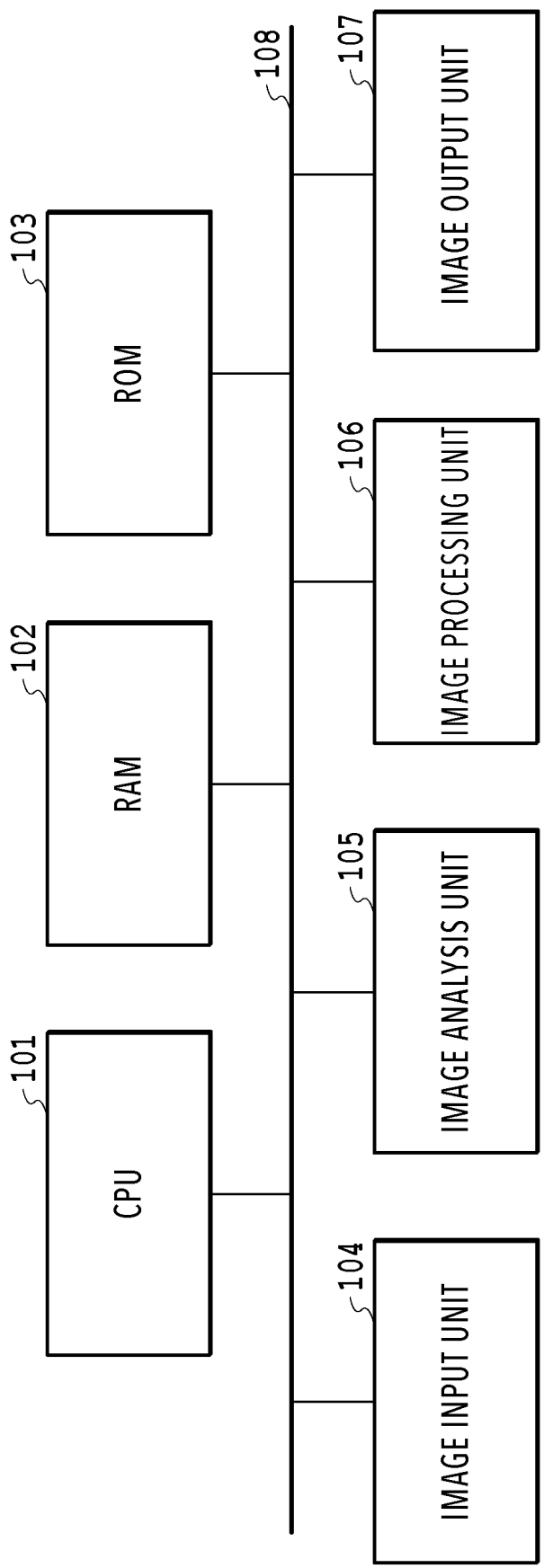
FIG. 1 is a block diagram illustrating the configuration of an image processing apparatus according to a first embodiment.

FIG. 1 is a block diagram illustrating the configuration of an image processing apparatus according to a first embodiment. A CPU 101 controls the image processing apparatus. An RAM 102 is used as a work memory for the CPU 101 and a memory for temporarily storing image data to be processed. An ROM 103 holds a program to be executed by the CPU 101. An image input unit 104 is a communication interface that receives image data. Also, the image input unit 104 functions as a development process part that is connected to an image sensor and generates image data by processing signals from the image sensor. The image input unit 104 transfers the received or generated image data to the RAM 102. An image analysis unit 105 analyzes the image data input by the image input unit 104 and generates an attribute map corresponding to the image data. An image processing unit 106 refers to the attribute map generated by the image analysis unit 105 and performs predetermined processing on the image data input by the image input unit 104. An image output unit 107 is a communication interface that transmits the processed image. Also, the image output unit 107 has a print engine that forms images on a print medium. The image output unit 107 also has a display engine that displays images on a display. A system bus 108 is a data transfer channel between the CPU 101, the RAM 102, the ROM 103, the image input unit 104, the image analysis unit 105, the image processing unit 106, and the image output unit 107.

Figure 2:
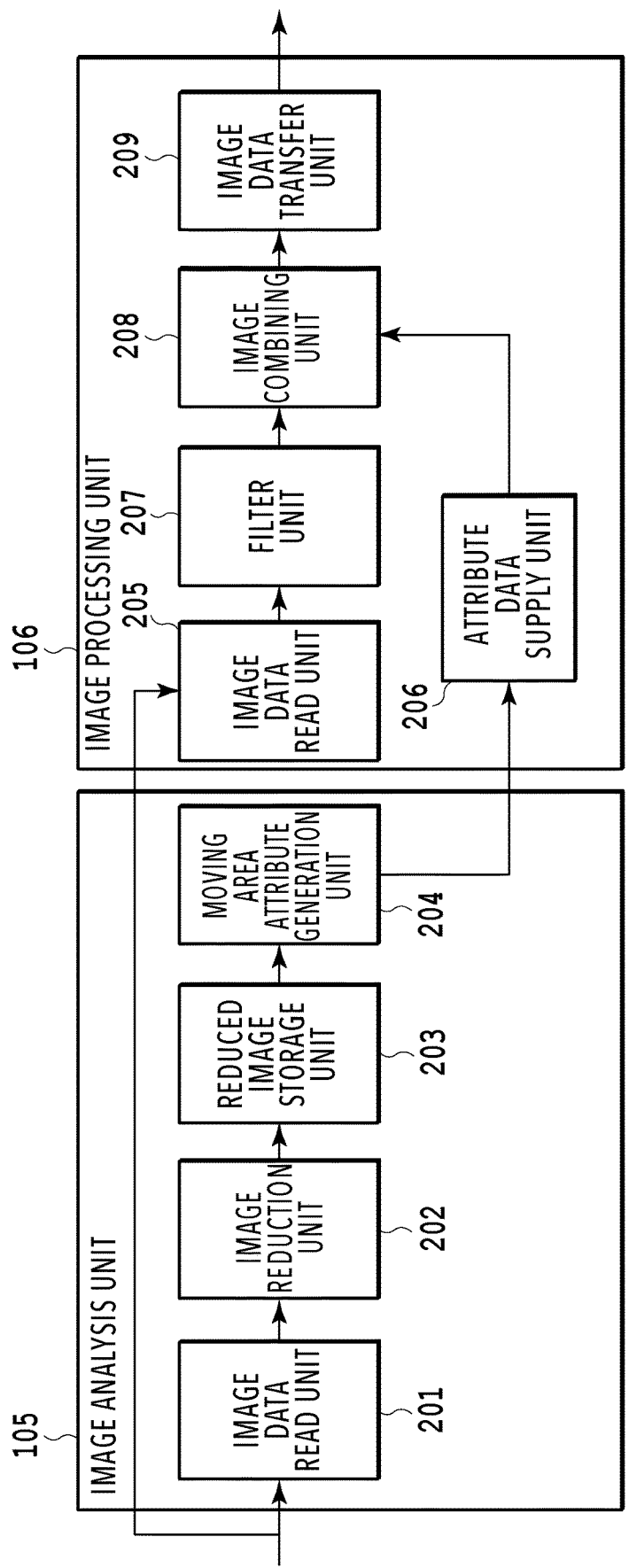
FIG. 2 is a block diagram illustrating the configurations of an image analysis unit and an image processing unit.

FIG. 2 is a block diagram illustrating the configurations of the image analysis unit 105 and the image processing unit 106. Each configuration is implemented by circuitry. In the image analysis unit 105, an image data read unit 201 reads out image data transferred to the RAM 102 by the image input unit 104 and supplies it to an image reduction unit 202. The image reduction unit 202 reduces the size of the image data supplied from the image data read unit 201 in the height direction and the width direction and supplies the reduced image to a reduced image storage unit 203. The reduced image storage unit 203 stores a plurality of pieces of image data supplied from the image reduction unit 202 and supplies them to a moving area attribute generation unit 204. The moving area attribute generation unit 204 generates an attribute map by comparing a plurality of images represented by the plurality of pieces of image data stored in the reduced image storage unit 203 and detecting pixels representing different edges. The moving area attribute generation unit 204 sends the generated attribute map to an attribute data supply unit 206. In practice, the moving area attribute generation unit 204 transfers the generated attribute map to the RAM 102, and the attribute data supply unit 206 reads out the attribute map transferred to the RAM 102.

In the image processing unit 106, an image data read unit 205 reads the plurality of pieces of image data transferred to the RAM 102 by the image input unit 104. The image data read unit 205 geometrically transforms the pieces of read image data, partitions them into block areas (rectangular areas in this embodiment) of a desired size, and supplies them to a filter unit 207. The attribute data supply unit 206 reads out the attribute map transferred to the RAM 102 by the moving area attribute generation unit 204 of the image analysis unit 105 and supplies attribute data corresponding to combining target pixels to an image combining unit 208. The filter unit 207 calculates the average of pixel values from each small rectangle formed of five pixels in height by five pixels in width centered at a pixel of interest and outputs it as the pixel value of the pixel of interest. The image combining unit 208 combines the plurality of images input from the filter unit 207 based on the attribute data input from the attribute data supply unit 206, to thereby generate a combined image. More specifically, the image combining unit 208 is equipped with an interface allowing input on a pixel-by-pixel basis and, after the number of images to be combined is set, the image combining unit 208 combines successively input pixels while assuming that they are pixels at the same coordinates belonging respectively to the set number of combining target images. An image data transfer unit 209 transfers the image combined by the image combining unit 208 to the RAM 102.

Figure 3:
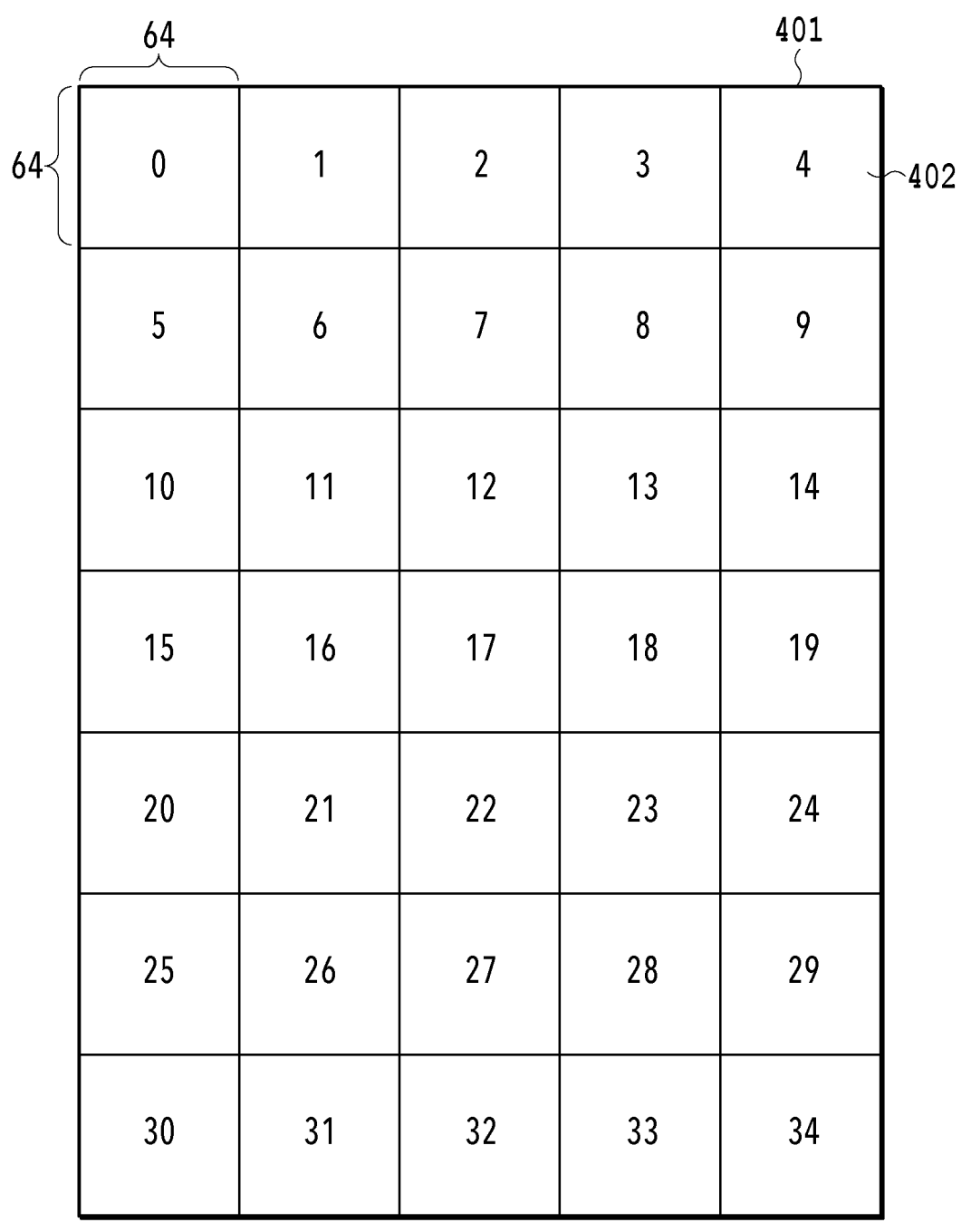

FIG. 3 is a diagram illustrating a processing target image divided into rectangular areas of a desired size. This embodiment of a processing target image 401 is an image with 448 pixels in height by 320 pixels in width. Each rectangular area 402 is a region with 64 pixels in height by 64 pixels in width. The numbers in the rectangular areas represent the order of processing. In the following, the n-th (n=0, 1, 2 . . . ) processed rectangular area in the processing target image and the attribute map will be denoted as "rectangle # n". If the number of pixels in the processing target image 401 in the height direction or the width direction is not a multiple of 64, the processing target image 401 is divided into rectangular areas after padding is performed at the lower end or the right end such that the number of pixels is a multiple of 64.

Figure 4:
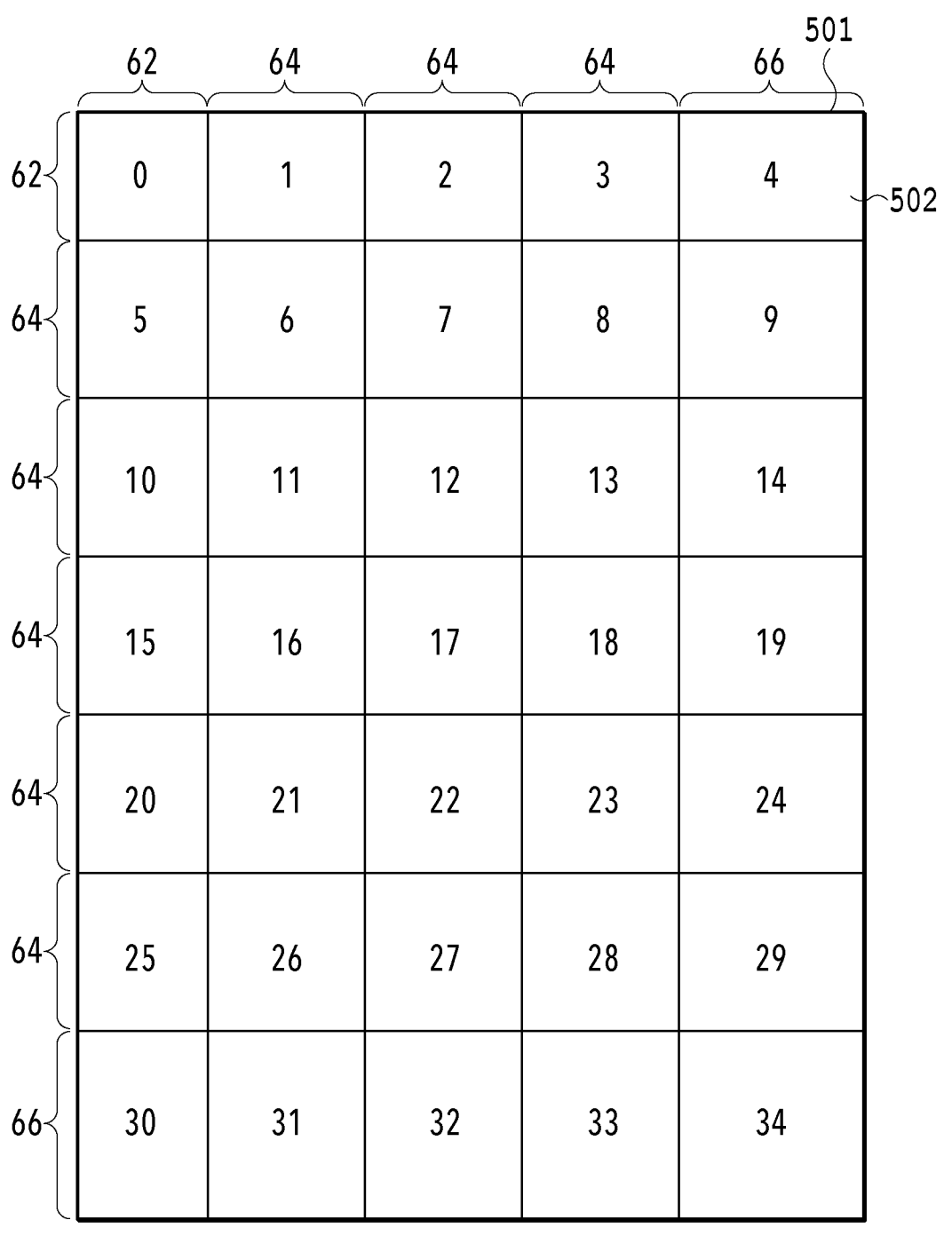

FIG. 4 is a diagram illustrating rectangular areas in a processing target image after a filter process. A processing target image 501 is a processing target image after the filter process and coincides in size with the processing target image 401. Each rectangular area 502 is a rectangular area after the filter process. The numbers in the rectangular areas represent the order of processing and correspond to the numbers in the rectangular areas 402. Note that FIG. 4 illustrates a processing target image after being subjected to a filter process that outputs the average of the pixel values of five pixels in height by five pixels in width centered at a pixel of interest as the pixel value of the pixel of interest. In the case of executing such a filter process, the filter operation in which the pixel of interest is a pixel at the right end of, for example, the rectangular area #0, #5, #10, #15, #20, #25, or #30 cannot be executed until the first and second pixels from the left end of the adjacent rectangular area #1, #6, #11, #16, #21, #26, or #31 are determined. As a result, the rectangular areas 502 in the processing target image 501 after the filter process are output in different sizes based on their positions in the processing target image 501. Specifically, in the processing target image 501 after the filter process, the width of the rectangular areas at the left end is 62 pixels, the width of the rectangular areas at the right end is 66 pixels, and the width of the rectangular areas therebetween is 64 pixels, as illustrated in FIG. 4. Also, the height of the rectangular areas at the upper end is 62 pixels, the height of the rectangular areas at the lower end is 66 pixels, and the height of the rectangular areas therebetween is 64 pixels. Note that, in the case where the pixel of interest is a pixel at the left end of a rectangular area at the left end (rectangular area #0, #5, #10, #15, #20, #25, or #30), the filter unit 207 calculates the pixel value of the pixel of interest by adding two columns of dummy pixels lying adjacently to the left side of the rectangular area. Also, in the case where the pixel of interest is a pixel at the upper end of a rectangular area at the upper end (rectangular area #0, #1, #2, #3, or #4), the filter unit 207 calculates the pixel value of the pixel of interest by adding two rows of dummy pixels lying adjacently to the upper side of the rectangular area.

Figure 5:
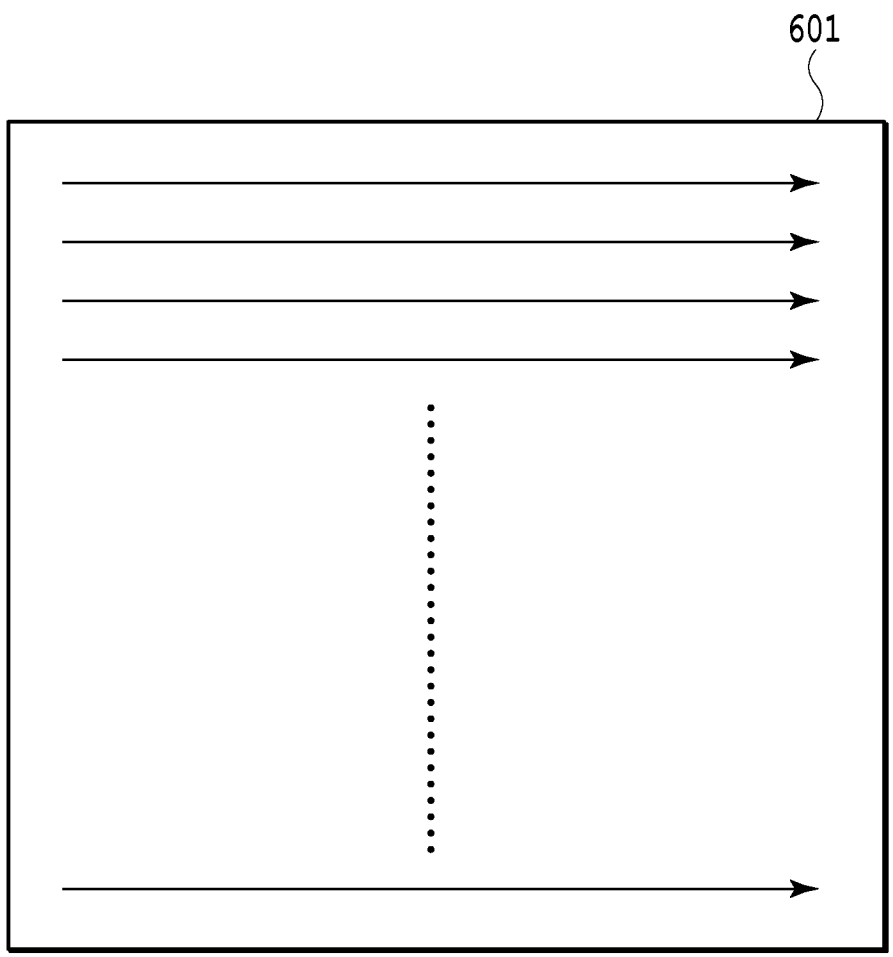
FIG. 5 is a diagram illustrating the order of processing of the pixels in a rectangular area.

FIG. 5 is a diagram illustrating the direction of processing of the pixels in a rectangular area. A rectangular area 601, illustrated in FIG. 5, represents one of the rectangular areas illustrated in FIG. 3. The arrows in the rectangular area 601 represent the direction of processing of the pixels in the rectangular area. In other words, the filter unit 207 processes the pixels in each rectangular area illustrated in FIG. 3 in the direction illustrated in FIG. 5. As illustrated, the filter unit 207 processes the pixels in each rectangular area from the top line toward the bottom line and processes from the leftmost pixel toward the processable rightmost pixel in each line. As described above, the rightmost pixel in the rectangular region 601 may not be a processable pixel. In this case, before reaching the rightmost pixel in the rectangular region 601, a target pixel to be processed moves to the lower line. For example, when the rectangular area 601 is the rectangular area #0 shown in FIG. 3, a pixel next to the left by two pixels from the rightmost pixel is processed, and then the pixel on the leftmost of the next lower line is subsequently processed. The filter unit 207 supplies the pixels in each rectangular area after the filter process illustrated in FIG. 4 to the image combining unit 208 in the same order. Therefore, in the filter unit 207, the pixel order of receiving pixel values and the pixel order of outputting the filtering processing result are different. Moreover, the attribute data supply unit 206 likewise supplies the attribute data corresponding to the pixels in each rectangular area after the filter process to the image combining unit 208 in the order illustrated in FIG. 5.

FIG. 6 is a diagram illustrating the order of pixels to be supplied to the image combining unit 208 by the filter unit 207 in the case where two images are combined. A rectangular area 701 is a rectangular area in a first combining target image. A rectangular area 702 is a rectangular area in a second combining target image. The first combining target image and the second combining target image are processing target images after the filter process to be supplied to the image combining unit 208. First, the first pixel in the rectangular area 701 of the first combining target image is supplied to the image combining unit 208, and then the first pixel in the rectangular area 702 of the second combining target image is supplied to the image combining unit 208. Subsequently, the second pixel in the rectangular area 701 of the first combining target image is supplied to the image combining unit 208, and then the second pixel in the rectangular area 702 of the second combining target image is supplied to the image combining unit 208. Pixels in the corresponding rectangular areas of the first combining target image and the second combining target image are alternately supplied in this manner. This process is repeated from the first rectangular area (upper left rectangular area) to the last rectangular area (lower right rectangular area) in each of the first combining target image and the second combining target image.

The order of supply of the attribute data to the image combining unit 208 is the same as that of the combining target images illustrated in FIG. 6. For example, in a case of supplying attribute data from a single attribute map, first, the first pixel in a rectangular area of each combining target image is supplied to the image combining unit 208, and then the first pixel in the attribute map is supplied as attribute data to the image combining unit 208. Subsequently, the second pixel in the rectangular area of the combining target image is supplied to the image combining unit 208, and then the second pixel in the attribute map is supplied to the image combining unit 208 as attribute data. Thereafter, in a similar manner, the n-th (n=1 to 4096) pixel in the rectangular area of the combining target image is supplied to the image combining unit 208, and then the n-th pixel in the attribute map is supplied as attribute data to the image combining unit 208. That is, the attribute data supply unit 206 supplies the attribute data to the image combining unit 208 according to the pixel order in which the filter processing unit 207 outputs the filter processing result.

Figure 7A:
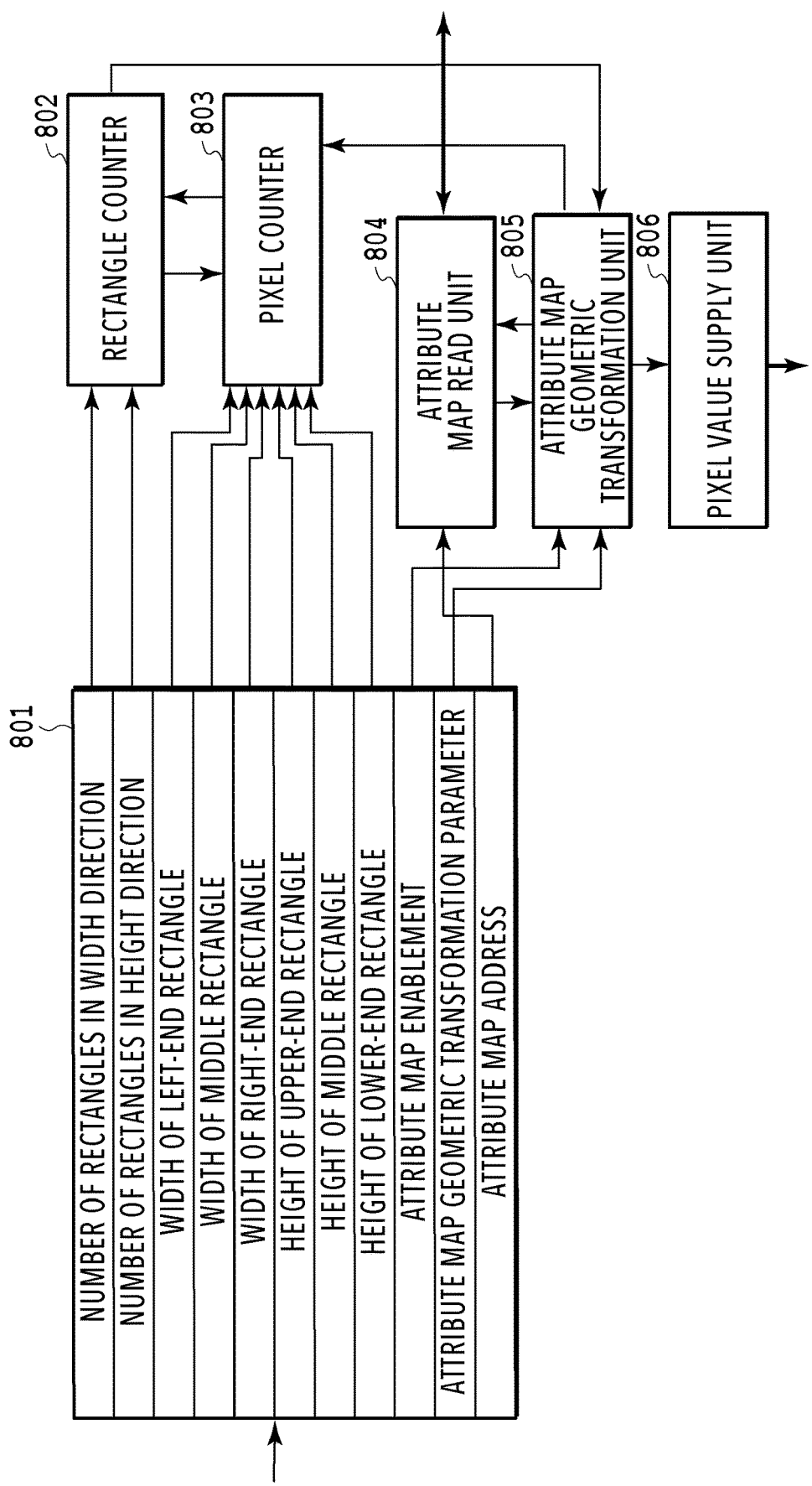
FIG. 7A is a block diagram illustrating the configuration of an attribute data supply unit.

FIG. 7A is a block diagram illustrating the configuration of the attribute data supply unit 206. As illustrated in FIG. 7A, the attribute data supply unit 206 includes a register 801, a rectangle counter 802, a pixel counter 803, an attribute map read unit 804, an attribute map geometric transformation unit 805, and a pixel value supply unit 806.

The register 801 holds parameters that determine the operation of the rectangle counter 802, the pixel counter 803, the attribute map read unit 804, and the attribute map geometric transformation unit 805. In this embodiment, the register 801 holds the number of rectangles in the width direction and the number of rectangles in the height direction as information on the processing target images. Also, the register 801 holds the left-end rectangle width, the middle rectangle width, the right-end rectangle width, the upper-end rectangle height, the middle rectangle height, and the lower-end rectangle height as filter information. The attribute data supply unit 206 can identify the size of each rectangular area from the filter information. The filter information is derived in advance based on the method of the filter process executed by the filter unit 207, for example. Also, the register 801 holds attribute map enablement, an attribute map geometric transformation parameter, and an attribute map address as attribute information. Note that in a case where the image processing apparatus performs image combining by using a plurality of attribute maps, the register 801 may hold attribute map enablement, an attribute map geometric transformation parameter, and an attribute map address for each attribute map. FIG. 7B illustrates an example of the parameters held in the register 801 in a case where there are two types of attribute information. In this case, the register 801 holds first attribute map enablement, a first attribute map geometric transformation parameter, a first attribute map address, second attribute map enablement, a second attribute map geometric transformation parameter, and a second attribute map address as the attribute information. The parameters held in the register 801 can be read and written by the CPU 101. The rectangle counter 802 counts the number of rectangular areas that have finished being processed. The attribute data supply unit 206 can identify the positions of the currently processed rectangular area in the width direction and the height direction within the entire image from the value of the rectangle counter 802 and parameters held in the register 801 (e.g., the number of rectangles in the width direction and the number of rectangles in the height direction). Also, the attribute data supply unit 206 can identify the size (width and height) of the currently processed rectangular area from the identified position and parameters held in the register 801 (e.g., filter information). The pixel counter 803 counts the pixels in the rectangular area that have finished being processed. The attribute data supply unit 206 can identify the pixel position of the currently processed pixel in the rectangular area from the value of the pixel counter 803 and the size of the rectangular area. The attribute map read unit 804 accesses the RAM 102 and reads out the attribute map generated by the image analysis unit 105. The attribute map geometric transformation unit 805 controls the attribute map read unit 804 to read out the attribute map, geometrically transforms the attribute map in accordance with the attribute map geometric transformation parameter, and generates rectangular areas. Now, an attribute map geometric transformation parameter in a case of employing an affine transformation, which is a typical linear transformation, as the geometric transformation will be described. Using four coefficients a, b, c, and d, the affine transformation is expressed as $(X, Y)=(ax+by, cx+dy)$ on the assumption that the coordinates before the transformation are $(x, y)$ and the coordinates after the transformation are $(X, Y)$. Thus, the register 801 holds the coefficients a, b, c, and d as the attribute map geometric transformation parameter. The pixel value supply unit 806 supplies the pixel values (attribute values) read out from the attribute map to the image combining unit 208 as attribute data.

High-dynamic-range (HDR) processing using a moving area map as the attribute map will be described below. Here, for simplicity, the description will be given by taking an example performing no geometric transformation.

Figure 8:
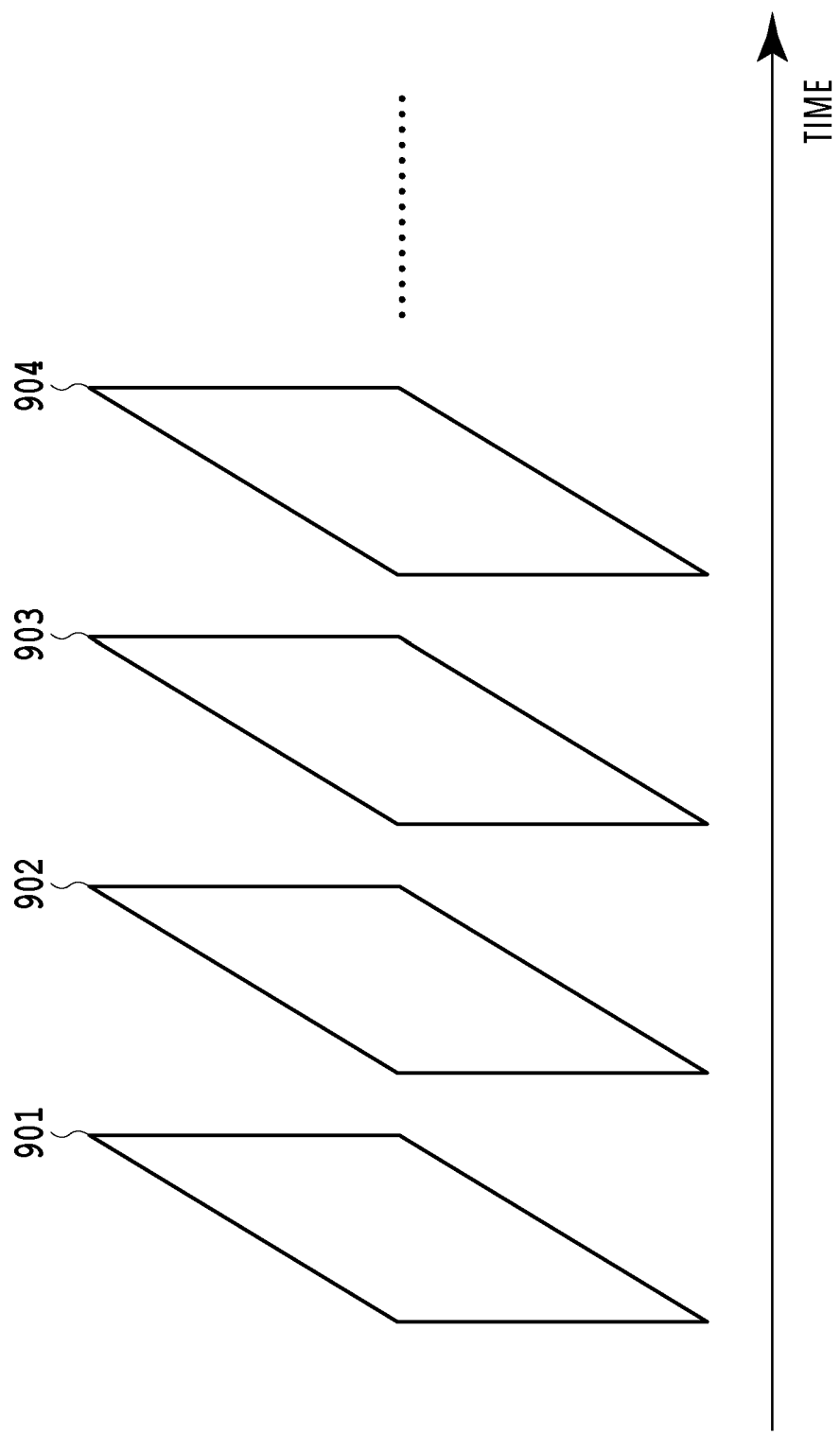
FIG. 8 is a diagram for explaining the order of input images.

An image sensor is connected to the image input unit 104, and long exposure images and short exposure images are input thereto from the image sensor in a time-division manner. Here, in the case where two images differing in duration of exposure are captured, the image among these two images with the longer duration of exposure is a long exposure image while the image with the shorter duration of exposure is a short exposure image. FIG. 8 is a diagram for explaining the order of input images. An image 901, illustrated in FIG. 8, is the i-th (i=1, 2, 3, . . . ) long exposure image. An image 902 is the i-th short exposure image. An image 903 is the (i+1)-th long exposure image. An image 904 is the (i+1)-th short exposure image. The image input unit 104 transfers the long exposure images and short exposure images to a predetermined addresses in the RAM 102.

In the image analysis unit 105, first, the image data read unit 201 reads out the i-th long exposure image and the i-th short exposure image from the RAM 102. Then, the image reduction unit 202 reduces the size of the i-th long exposure image and the i-th short exposure image to ¼ in each of the height direction and the width direction and stores them in the reduced image storage unit 203. Then, the moving area attribute generation unit 204 compares the i-th long exposure image and the i-th short exposure image stored in the reduced image storage unit 203 and detects pixels representing different edges to thereby generate a moving area map. The size of the moving area map thus generated corresponds to the size of the reduced input images (long exposure image and short exposure image). In other words, a moving area map reduced in size to ¼ in each of the height direction and the width direction is generated. The moving area attribute generation unit 204 transfers the generated moving area map to a predetermined address in the RAM 102.

In the image processing unit 106, the image data read unit 205 reads out the rectangular areas illustrated in FIG. 3 alternately from the i-th long exposure image and the i-th short exposure image out of the RAM 102 and supplies them to the filter unit 207. The filter unit 207 performs the filter process on a rectangular area in the i-th long exposure image and subsequently performs the filter process on a rectangular area in the i-th short exposure image. As described above, the rectangular areas in the i-th long exposure image after the filter process and the rectangular areas in the i-th short exposure image after the filter process both have different sizes based on their positions, as illustrated in FIG. 4. Thus, rectangular areas differing in size are sequentially supplied to the image combining unit 208. Also, the order of supply of the pixels in each rectangular area is such that the pixels in each rectangular area in the i-th long exposure image and the pixels in the corresponding rectangular area in the i-th short exposure image are supplied alternately, as illustrated in FIG. 6.

The attribute data supply unit 206 reads out the moving area map from the RAM 102, enlarges it, and supplies the moving area attribute data corresponding to the pixels of the combining target images to the image combining unit 208. Here, assume that a moving area map with 112 pixels in height by 80 pixels in width has been generated from images with 448 pixels in height by 320 pixels in width. Then, the register 801 of the attribute data supply unit 206 is set as follows: the number of rectangles in the width direction=5, the number of rectangles in the height direction=7, the left-end rectangle width=62, the middle rectangle width=64, the right-end rectangle width=66, the upper-end rectangle height=62, the middle rectangle height=64, the lower-end rectangle height=66, the attribute map enablement=1 (1 represents being enabled), the attribute map geometric transformation parameter=(a:4, b:0, c:0, d:4), and the attribute map address=the head address of the moving area map. Based on the above register set values, the attribute data supply unit 206 counts the rectangle position in the width direction and the height direction and the pixel position in the rectangle in the width direction and the height direction and supplies attribute data to the image combining unit 208 as follows.

Figure 9:
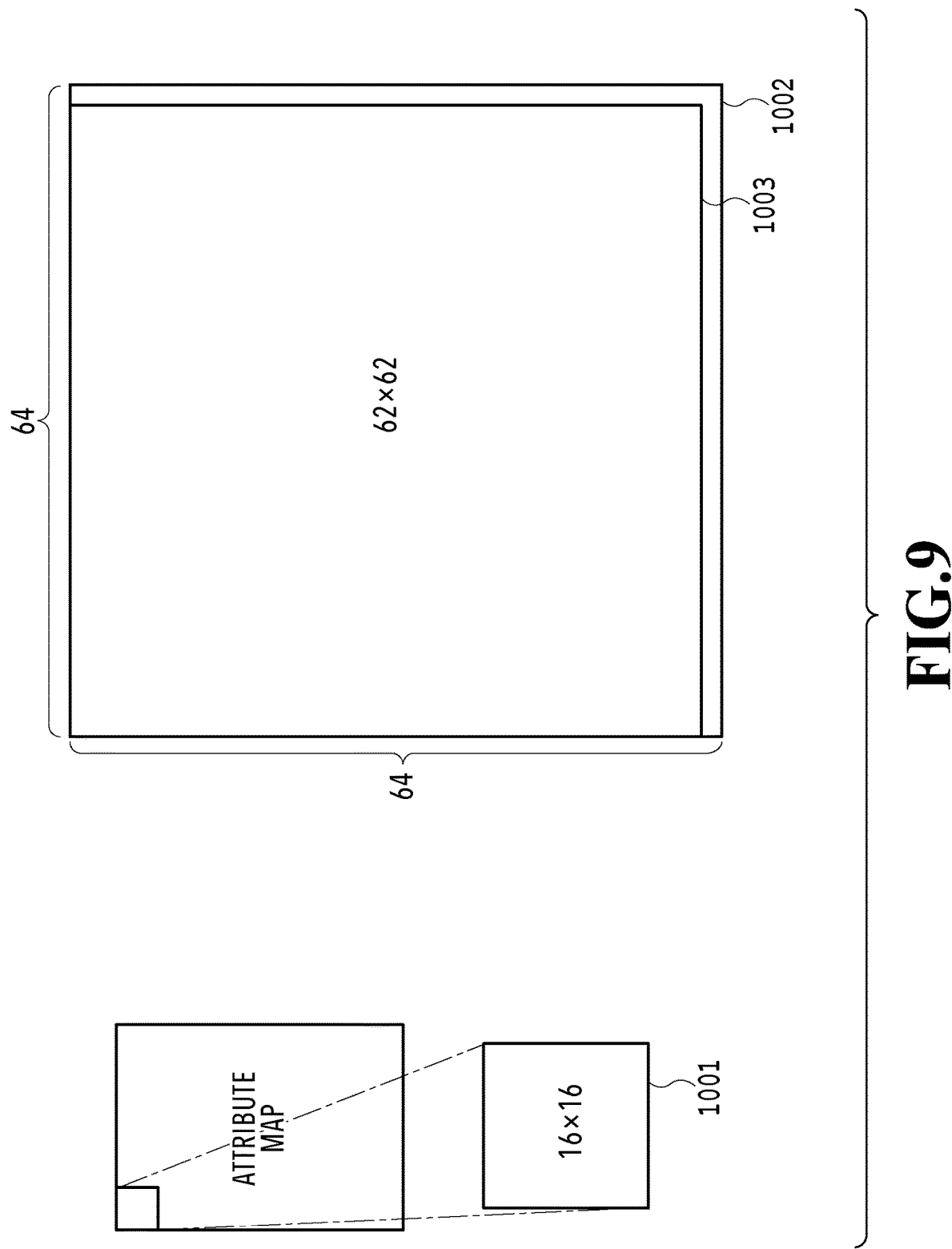
FIG. 9 is a diagram for explaining the relation between a rectangular area read out from an attribute map and pixels to be supplied to an image combining unit.

In the case where the image combining unit 208 combines the rectangle #0 illustrated in FIG. 4, the attribute data supply unit 206 reads out the pixels (0, 0) to (15, 0), (0, 1) to (15, 1), . . . , (0, 15) to (15, 15) in the moving area map. Here, the numbers in parentheses represent a pixel position in the width direction and a pixel position in the height direction. FIG. 9 is a diagram for explaining the relation between a rectangular area read out from the attribute map (the moving area map in this example) (the rectangular area corresponding to the rectangle #0) and pixels to be supplied to the image combining unit 208. A rectangular area 1001 is a rectangular area with 16×16 pixels read out from the moving area map. A rectangular area 1002 is a rectangular area obtained by enlarging the rectangular area 1001 four times in both height and width, which corresponds to the reduction ratio. A rectangular area 1003 represents a rectangular area with 62×62 pixels to be supplied to the image combining unit 208 within the enlarged rectangular area 1002. In other words, the pixel values of the rectangular area 1003 are supplied as attribute data (moving area attribute data in this example) to the image combining unit 208. An operation example in which the attribute data supply unit 206 supplies moving area attribute data from a rectangular area in the moving area map (the rectangular area corresponding to the rectangle #0) will be presented below.

For combining of the first to fourth lines in the rectangle #0, the attribute data supply unit 206 repetitively supplies the values of the pixels (0, 0) to (14, 0) in the moving area map four times each to the image combining unit 208 and then supplies the value of the pixel (15, 0) twice to the image combining unit 208. Similarly, for combining of the fifth to eighth lines, the attribute data supply unit 206 repetitively supplies the values of the pixels (0, 1) to (14, 1) in the moving area map four times each to the image combining unit 208 and then supplies the value of the pixel (15, 1) twice to the image combining unit 208. Subsequently, in a similar manner, for combining of the 9th to 12th lines, the attribute data supply unit 206 supplies the values of the pixels (0, 2) to (15, 2) in the moving area map. For combining of the 13th to 16th lines, the attribute data supply unit 206 supplies the values of the pixels (0, 3) to (15, 3) in the moving area map. For combining of the 17th to 20th lines, the attribute data supply unit 206 supplies the values of the pixels (0, 4) to (15, 4) in the moving area map. For combining of the 21st to 24th lines, the attribute data supply unit 206 supplies the values of the pixels (0, 5) to (15, 5) in the moving area map. For combining of the 25th to 28th lines, the attribute data supply unit 206 supplies the values of the pixels (0, 6) to (15, 6) in the moving area map. For combining of the 29th to 32nd lines, the attribute data supply unit 206 supplies the values of the pixels (0, 7) to (15, 7) in the moving area map. For combining of the 33rd to 36th lines, the attribute data supply unit 206 supplies the values of the pixels (0, 8) to (15, 8) in the moving area map. For combining of the 37th to 40th lines, the attribute data supply unit 206 supplies the values of the pixels (0, 9) to (15, 9) in the moving area map. For combining of the 41st to 44th lines, the attribute data supply unit 206 supplies the values of the pixels (0, 10) to (15, 10) in the moving area map. For combining of the 45th to 48th lines, the attribute data supply unit 206 supplies the values of the pixels (0, 11) to (15, 11) in the moving area map. For combining of the 49th to 52nd lines, the attribute data supply unit 206 supplies the values of the pixels (0, 12) to (15, 12) in the moving area map. For combining of the 53rd to 56th lines, the attribute data supply unit 206 supplies the values of the pixels (0, 13) to (15, 13) in the moving area map. For combining of the 57th to 60th lines, the attribute data supply unit 206 supplies the values of the pixels (0, 14) to (15, 14) in the moving area map. For combining of the 61st to 62nd lines, the attribute data supply unit 206 supplies the values of the pixels (0, 15) to (15, 15) in the moving area map.

Figure 10:
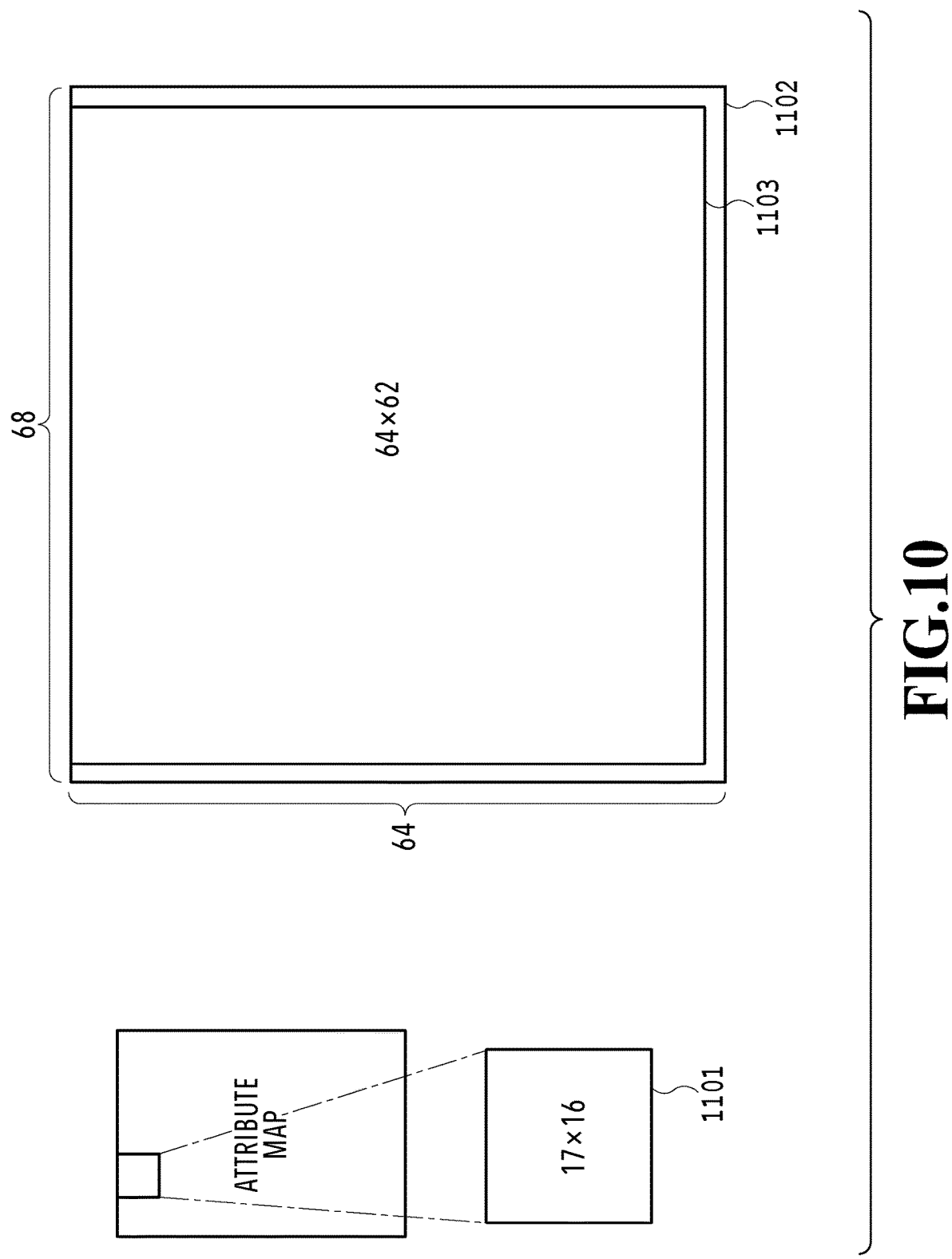
FIG. 10 is a diagram for explaining the relation between a rectangular area read out from the attribute map and pixels to be supplied to the image combining unit.

In the case where the image combining unit 208 combines the rectangle #1 illustrated in FIG. 4, the attribute data supply unit 206 reads out the pixels (15, 0) to (31, 0), (15, 1) to (31, 1), . . . , (15, 15) to (31, 15) in the moving area map. FIG. 10 is a diagram for explaining the relation between a rectangular area read out from the moving area map (the rectangular area corresponding to the rectangle #1) and pixels to be supplied to the image combining unit 208. A rectangular area 1101 is a rectangular area with 17×16 pixels read out from the moving area map. A rectangular area 1102 is a rectangular area obtained by enlarging the rectangular area 1101 four times in both height and width, which corresponds to the reduction ratio. A rectangular area 1103 represents a rectangular area with 64×62 pixels to be supplied to the image combining unit 208 within the enlarged rectangular area 1102. In other words, the pixel values of the rectangular area 1103 are supplied as moving area attribute data to the image combining unit 208. An operation example in which the attribute data supply unit 206 supplies moving area attribute data from a rectangular area in the moving area map (the rectangular area corresponding to the rectangle #1) will be presented below.

For combining of the first to fourth lines in the rectangle #1, the attribute data supply unit 206 repetitively supplies the value of the pixel (15, 0) in the moving area map twice to the image combining unit 208, repetitively supplies the values of the pixels (16, 0) to (30, 0) four times each to the image combining unit 208, and further supplies the value of the pixel (31, 0) twice to the image combining unit 208. Subsequently, in a similar manner, for combining of the fifth to eighth lines, the attribute data supply unit 206 supplies the values of the pixels (15, 1) to (31, 1) in the moving area map. For combining of the 9th to 12th lines, the attribute data supply unit 206 supplies the values of the pixels (15, 2) to (31, 2) in the moving area map. For combining of the 13th to 16th lines, the attribute data supply unit 206 supplies the values of the pixels (15, 3) to (31, 3) in the moving area map. For combining of the 17th to 20th lines, the attribute data supply unit 206 supplies the values of the pixels (15, 4) to (31, 4) in the moving area map. For combining of the 21st to 24th lines, the attribute data supply unit 206 supplies the values of the pixels (15, 5) to (31, 5) in the moving area map. For combining of the 25th to 28th lines, the attribute data supply unit 206 supplies the values of the pixels (15, 6) to (31, 6) in the moving area map. For combining of the 29th to 32nd lines, the attribute data supply unit 206 supplies the values of the pixels (15, 7) to (31, 7) in the moving area map. For combining of the 33rd to 36th lines, the attribute data supply unit 206 supplies the values of the pixels (15, 8) to (31, 8) in the moving area map. For combining of the 37th to 40th lines, the attribute data supply unit 206 supplies the values of the pixels (15, 9) to (31, 9) in the moving area map. For combining of the 41st to 44th lines, the attribute data supply unit 206 supplies the values of the pixels (15, 10) to (31, 10) in the moving area map. For combining of the 45th to 48th lines, the attribute data supply unit 206 supplies the values of the pixels (15, 11) to (31, 11) in the moving area map. For combining of the 49th to 52nd lines, the attribute data supply unit 206 supplies the values of the pixels (15, 12) to (31, 12) in the moving area map. For combining of the 53rd to 56th lines, the attribute data supply unit 206 supplies the values of the pixels (15, 13) to (31, 13) in the moving area map. For combining of the 57th to 60th lines, the attribute data supply unit 206 supplies the values of the pixels (15, 14) to (31, 14) in the moving area map. For combining of the 61st to 62nd lines, the attribute data supply unit 206 supplies the values of the pixels (15, 15) to (31, 15) in the moving area map. The rectangles #2 and #3 are also processed in a similar manner to the rectangle #1.

Figure 11:
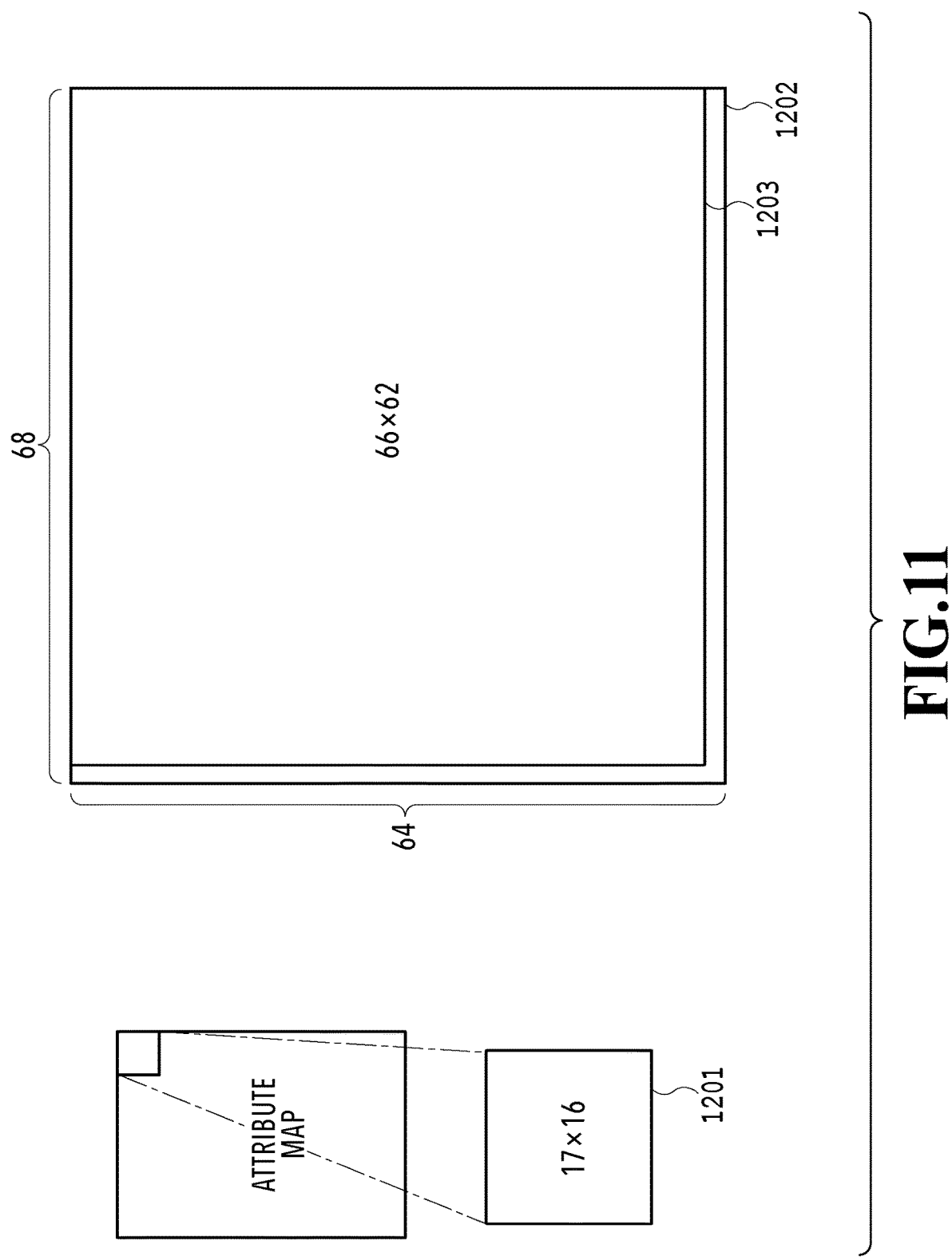
FIG. 11 is a diagram for explaining the relation between a rectangular area read out from the attribute map and pixels to be supplied to the image combining unit.

In the case where the image combining unit 208 combines the rectangle #4 illustrated in FIG. 4, the attribute data supply unit 206 reads out the pixels (63, 0) to (79, 0), (63, 1) to (79, 1), . . . , (63, 15) to (79, 15) in the moving area map. FIG. 11 is a diagram for explaining the relation between a rectangular area read out from the moving area map (the rectangular area corresponding to the rectangle #4) and pixels to be supplied to the image combining unit 208. A rectangular area 1201 is a rectangular area with 17×16 pixels read out from the moving area map. A rectangular area 1202 is a rectangular area obtained by enlarging the rectangular area 1201 four times in both height and width, which corresponds to the reduction ratio. A rectangular area 1203 represents a rectangular area with 66×62 pixels to be supplied to the image combining unit 208 within the enlarged rectangular area 1202. In other words, the pixel values of the rectangular area 1203 are supplied as moving area attribute data to the image combining unit 208. An operation example in which the attribute data supply unit 206 supplies moving area attribute data from a rectangular area in the moving area map (the rectangular area corresponding to the rectangle #4) will be presented below.

For combining of the first to fourth lines in the rectangle #4, the attribute data supply unit 206 repetitively supplies the value of the pixel (63, 0) in the moving area map twice to the image combining unit 208 and repetitively supplies the values of the pixels (64, 0) to (79, 0) four times each to the image combining unit 208. Subsequently, in a similar manner, for combining of the fifth to eighth lines, the attribute data supply unit 206 supplies the values of the pixels (63, 1) to (79, 1) in the moving area map. For combining of the 9th to 12th lines, the attribute data supply unit 206 supplies the values of the pixels (63, 2) to (79, 2) in the moving area map. For combining of the 13th to 16th lines, the attribute data supply unit 206 supplies the values of the pixels (63, 3) to (79, 3) in the moving area map. For combining of the 17th to 20th lines, the attribute data supply unit 206 supplies the values of the pixels (63, 4) to (79, 4) in the moving area map. For combining of the 21st to 24th lines, the attribute data supply unit 206 supplies the values of the pixels (63, 5) to (79, 5) in the moving area map. For combining of the 25th to 28th lines, the attribute data supply unit 206 supplies the values of the pixels (63, 6) to (79, 6) in the moving area map. For combining of the 29th to 32nd lines, the attribute data supply unit 206 supplies the values of the pixels (63, 7) to (79, 7) in the moving area map. For combining of the 33rd to 36th lines, the attribute data supply unit 206 supplies the values of the pixels (63, 8) to (79, 8) in the moving area map. For combining of the 37th to 40th lines, the attribute data supply unit 206 supplies the values of the pixels (63, 9) to (79, 9) in the moving area map. For combining of the 41st to 44th lines, the attribute data supply unit 206 supplies the values of the pixels (63, 10) to (79, 10)

in the moving area map. For combining of the 45th to 48th lines, the attribute data supply unit 206 supplies the values of the pixels (63, 11) to (79, 11) in the moving area map. For combining of the 49th to 52nd lines, the attribute data supply unit 206 supplies the values of the pixels (63, 12) to (79, 12) in the moving area map. For combining of the 53rd to 56th lines, the attribute data supply unit 206 supplies the values of the pixels (63, 13) to (79, 13) in the moving area map. For combining of the 57th to 60th lines, the attribute data supply unit 206 supplies the values of the pixels (63, 14) to (79, 14) in the moving area map. For combining of the 61st to 62nd lines, the attribute data supply unit 206 supplies the values of the pixels (63, 15) to (79, 15) in the moving area map.

Figure 12:
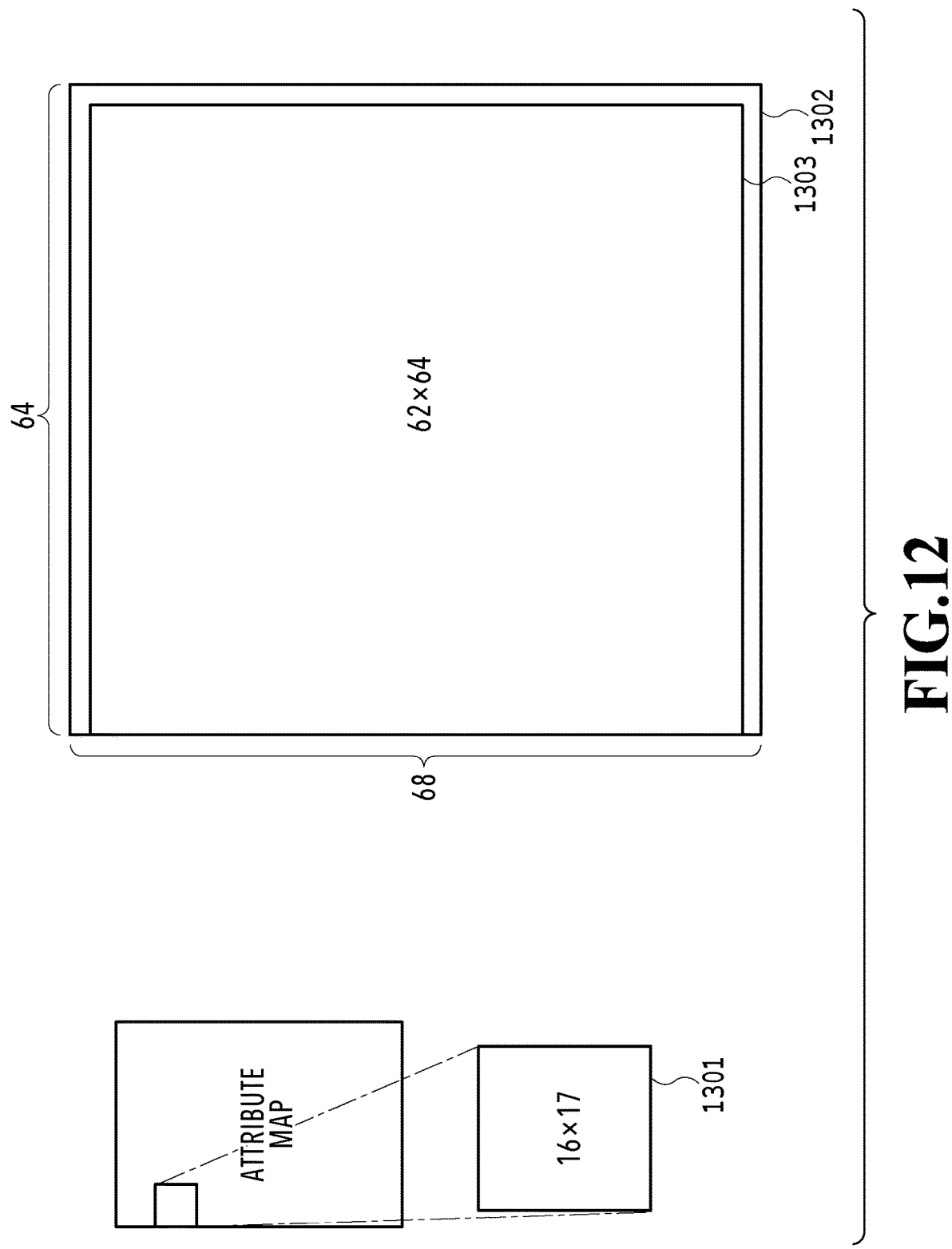
FIG. 12 is a diagram for explaining the relation between a rectangular area read out from the attribute map and pixels to be supplied to the image combining unit.

In the case where the image combining unit 208 combines the rectangle #5 illustrated in FIG. 4, the attribute data supply unit 206 reads out the pixels (0, 15) to (15, 15), (0, 16) to (15, 16), . . . , (0, 31) to (15, 31) in the moving area map. FIG. 12 is a diagram for explaining the relation between a rectangular area read out from the moving area map (the rectangular area corresponding to the rectangle #5) and pixels to be supplied to the image combining unit 208. A rectangular area 1301 is a rectangular area with 16×17 pixels read out from the moving area map. A rectangular area 1302 is a rectangular area obtained by enlarging the rectangular area 1301 four times in both height and width, which corresponds to the reduction ratio. A rectangular area 1303 represents a rectangular area with 62×64 pixels to be supplied to the image combining unit 208 within the enlarged rectangular area 1302. In other words, the pixel values of the rectangular area 1303 are supplied as moving area attribute data to the image combining unit 208. An operation example in which the attribute data supply unit 206 supplies the pixels of the moving area attribute from a rectangular area obtained by enlarging the moving area map (the rectangular area corresponding to the rectangle #5) will be presented below.

For combining of the first to second lines in the rectangle #5, the attribute data supply unit 206 repetitively supplies the values of the pixels (0, 15) to (14, 15) in the moving area map four times each to the image combining unit 208, and then supplies the value of the pixel (15, 15) twice to the image combining unit 208. For combining of the third to sixth lines, the attribute data supply unit 206 repetitively supplies the values of the pixels (0, 16) to (14, 16) four times each to the image combining unit 208, and then supplies the value of the pixel (15, 16) twice to the image combining unit 208. Subsequently, in a similar manner, for combining of the 7th to 10th lines, the attribute data supply unit 206 supplies the values of the pixels (0, 17) to (15, 17) in the moving area map. For combining of the 11th to 14th lines, the attribute data supply unit 206 supplies the values of the pixels (0, 18) to (15, 18) in the moving area map. For combining of the 15th to 18th lines, the attribute data supply unit 206 supplies the values of the pixels (0, 19) to (15, 19) in the moving area map. For combining of the 19th to 22nd lines, the attribute data supply unit 206 supplies the values of the pixels (0, 20) to (15, 20) in the moving area map. For combining of the 23rd to 26th lines, the attribute data supply unit 206 supplies the values of the pixels (0, 21) to (15, 21) in the moving area map. For combining of the 27th to 30th lines, the attribute data supply unit 206 supplies the values of the pixels (0, 22) to (15, 22) in the moving area map. For combining of the 31st to 34th lines, the attribute data supply unit 206 supplies the values of the pixels (0, 23) to (15, 23) in the moving area map. For combining of the 35th to 38th lines, the attribute data supply unit 206 supplies the values of the pixels (0, 24) to (15, 24) in the moving area map. For combining of the 39th to 42nd lines, the attribute data supply unit 206 supplies the values of the pixels (0, 25) to (15, 25) in the moving area map. For combining of the 43rd to 46th lines, the attribute data supply unit 206 supplies the values of the pixels (0, 26) to (15, 26) in the moving area map. For combining of the 47th to 50th lines, the attribute data supply unit 206 supplies the values of the pixels (0, 27) to (15, 27) in the moving area map. For combining of the 51st to 54th lines, the attribute data supply unit 206 supplies the values of the pixels (0, 28) to (15, 28) in the moving area map. For combining of the 55th to 58th lines, the attribute data supply unit 206 supplies the values of the pixels (0, 29) to (15, 29) in the moving area map. For combining of the 59th to 62nd lines, the attribute data supply unit 206 supplies the values of the pixels (0, 30) to (15, 30) in the moving area map. For combining of the 63rd to 64th lines, the attribute data supply unit 206 supplies the values of the pixels (0, 31) to (15, 31) in the moving area map.

Figure 13:
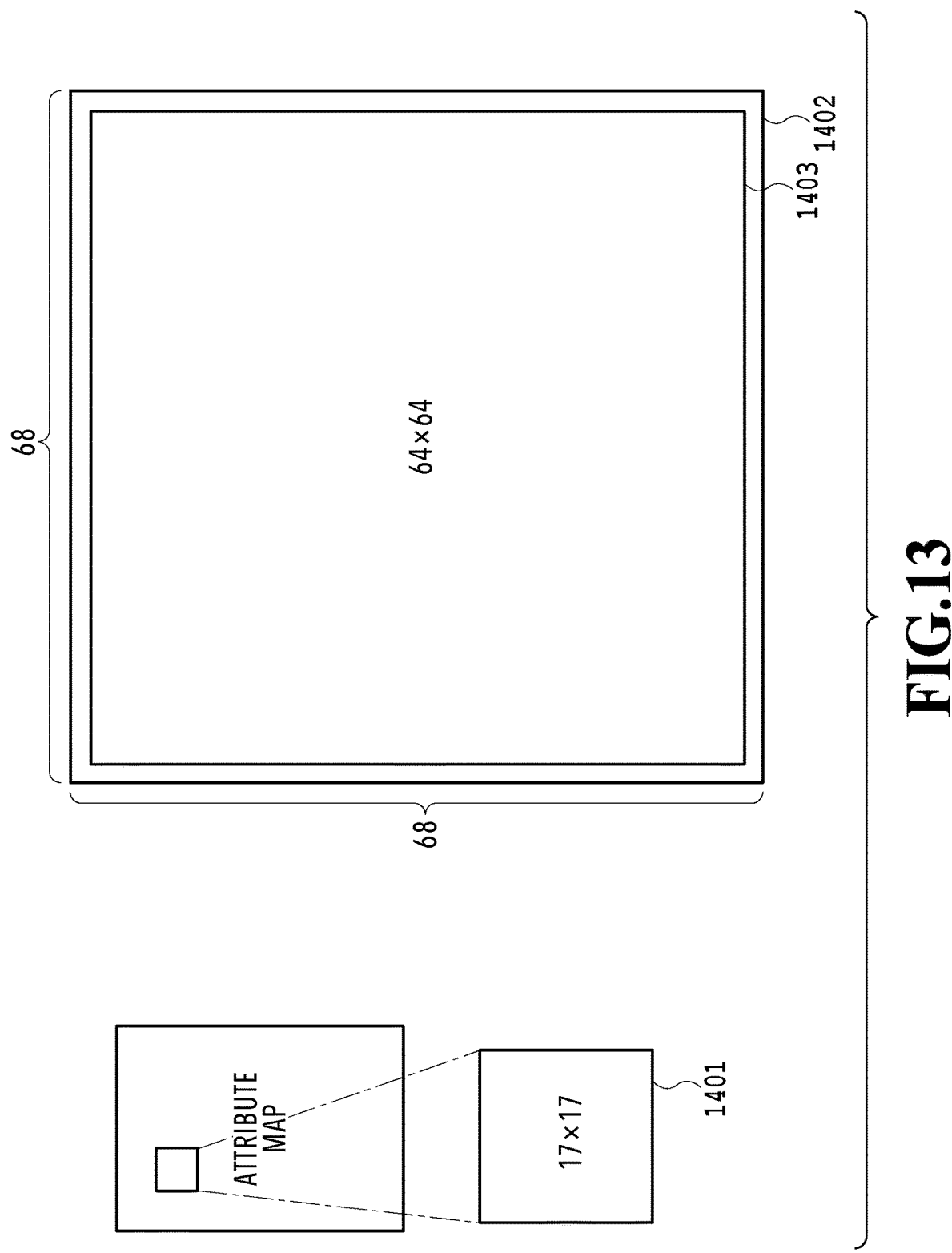
FIG. 13 is a diagram for explaining the relation between a rectangular area read out from the attribute map and pixels to be supplied to the image combining unit.

In the case where the image combining unit 208 combines the rectangle #6 illustrated in FIG. 4, the attribute data supply unit 206 reads out the pixels (15, 15) to (31, 15), (15, 16) to (31, 16), . . . , (15, 31) to (31, 31) in the moving area map. FIG. 13 is a diagram for explaining the relation between a rectangular area read out from the moving area map (the rectangular area corresponding to the rectangle #6) and pixels to be supplied to the image combining unit 208. A rectangular area 1401 is a rectangular area with 17×17 pixels read out from the moving area map. A rectangular area 1402 is a rectangular area obtained by enlarging the rectangular area 1401 four times in both height and width, which corresponds to the reduction ratio. A rectangular area 1403 represents a rectangular area with 64×64 pixels to be supplied to the image combining unit 208 within the enlarged rectangular area 1402. In other words, the pixel values of the rectangular area 1403 are supplied as moving area attribute data to the image combining unit 208. An operation example in which the attribute data supply unit 206 supplies moving area attribute data from a rectangular area in the moving area map (the rectangular area corresponding to the rectangle #6) will be presented below.

For combining of the first to second lines in the rectangle #6, the attribute data supply unit 206 repetitively supplies the value of the pixel (15, 15) in the moving area map twice to the image combining unit 208. Further, the attribute data supply unit 206 repetitively supplies the values of the pixels (16, 15) to (30, 15) four times each to the image combining unit 208, and then supplies the value of the pixel (31, 15) twice to the image combining unit 208. For combining of the third to sixth lines, the attribute data supply unit 206 repetitively supplies the value of the pixel (15, 16) twice to the image combining unit 208. Further, the attribute data supply unit 206 repetitively supplies the values of the pixels (16, 16) to (30, 16) four times each to the image combining unit 208, and then supplies the value of the pixel (31, 16) twice to the image combining unit 208. Subsequently, in a similar manner, for combining of the 7th to 10th lines, the attribute data supply unit 206 supplies the values of the pixels (15, 17) to (31, 17) in the moving area map. For combining of the 11th to 14th lines, the attribute data supply unit 206 supplies the values of the pixels (15, 18) to (31, 18) in the moving area map. For combining of the 15th to 18th lines, the attribute data supply unit 206 supplies the values of the pixels (15, 19) to (31, 19) in the moving area map. For combining of the 19th to 22nd lines, the attribute data supply unit 206 supplies the values of the pixels (15, 20) to (31, 20) in the moving area map. For combining of the 23rd to 26th lines, the attribute data supply unit 206 supplies the values of the pixels (15, 21) to (31, 21) in the moving area map. For combining of the 27th to 30th lines, the attribute data supply unit 206 supplies the values of the pixels (15, 22) to (31, 22) in the moving area map. For combining of the 31st to 34th lines, the attribute data supply unit 206 supplies the values of the pixels (15, 23) to (31, 23) in the moving area map. For combining of the 35th to 38th lines, the attribute data supply unit 206 supplies the values of the pixels (15, 24) to (31, 24) in the moving area map. For combining of the 39th to 42nd lines, the attribute data supply unit 206 supplies the values of the pixels (15, 25) to (31, 25) in the moving area map. For combining of the 43rd to 46th lines, the attribute data supply unit 206 supplies the values of the pixels (15, 26) to (31, 26) in the moving area map. For combining of the 47th to 50th lines, the attribute data supply unit 206 supplies the values of the pixels (15, 27) to (31, 27) in the moving area map. For combining of the 51st to 54th lines, the attribute data supply unit 206 supplies the values of the pixels (15, 28) to (31, 28) in the moving area map. For combining of the 55th to 58th lines, the attribute data supply unit 206 supplies the values of the pixels (15, 29) to (31, 29) in the moving area map. For combining of the 59th to 62nd lines, the attribute data supply unit 206 supplies the values of the pixels (15, 30) to (31, 30) in the moving area map. For combining of the 63rd to 64th lines, the attribute data supply unit 206 supplies the values of the pixels (15, 31) to (31, 31) in the moving area map. The rectangles #7 and #8 are also processed in a similar manner to the rectangle #6.

Figure 14:
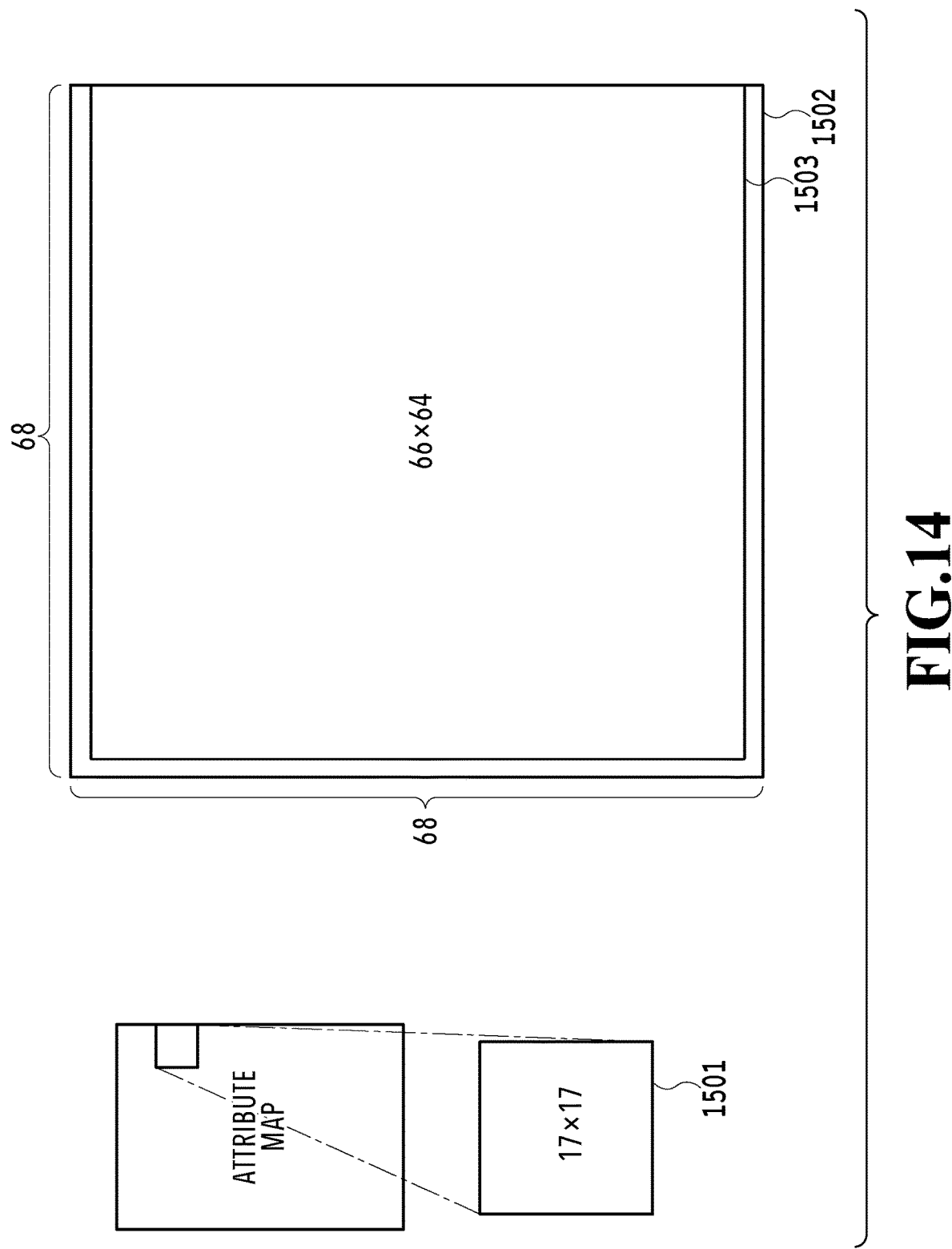
FIG. 14 is a diagram for explaining the relation between a rectangular area read out from the attribute map and pixels to be supplied to the image combining unit.

In the case where the image combining unit 208 combines the rectangle #9 illustrated in FIG. 4, the attribute data supply unit 206 reads out the pixels (63, 15) to (79, 15), (63, 16) to (79, 16), . . . , (63, 31) to (79, 31) in the moving area map. FIG. 14 is a diagram for explaining the relation between a rectangular area read out from the moving area map (the rectangular area corresponding to the rectangle #9) and pixels to be supplied to the image combining unit 208. A rectangular area 1501 is a rectangular area with 17×17 pixels read out from the moving area map. A rectangular area 1502 is a rectangular area obtained by enlarging the rectangular area 1501 four times in both height and width, which corresponds to the reduction ratio. A rectangular area 1503 represents a rectangular area with 66×64 pixels to be supplied to the image combining unit 208 within the enlarged rectangular area 1502. In other words, the pixel values of the rectangular area 1503 are supplied as moving area attribute data to the image combining unit 208. An operation example in which the attribute data supply unit 206 supplies moving area attribute data from a rectangular area in the moving area map (the rectangular area corresponding to the rectangle #9) will be presented below.

For combining of the first to second lines in the rectangle #9, the attribute data supply unit 206 repetitively supplies the value of the pixel (63, 15) in the moving area map twice to the image combining unit 208 and repetitively supplies the values of the pixels (64, 15) to (79, 15) four times each to the image combining unit 208. For combining of the third to sixth lines, the attribute data supply unit 206 repetitively supplies the value of the pixel (63, 16) in the moving area map twice to the image combining unit 208 and repetitively supplies the values of the pixels (64, 16) to (79, 16) four times each to the image combining unit 208. Subsequently, in a similar manner, for combining of the 7th to 10th lines, the attribute data supply unit 206 supplies the values of the pixels (63, 17) to (79, 17) in the moving area map. For combining of the 11th to 14th lines, the attribute data supply unit 206 supplies the values of the pixels (63, 18) to (79, 18) in the moving area map. For combining of the 15th to 18th lines, the attribute data supply unit 206 supplies the values of the pixels (63, 19) to (79, 19) in the moving area map. For combining of the 19th to 22nd lines, the attribute data supply unit 206 supplies the values of the pixels (63, 20) to (79, 20) in the moving area map. For combining of the 23rd to 26th lines, the attribute data supply unit 206 supplies the values of the pixels (63, 21) to (79, 21) in the moving area map. For combining of the 27th to 30th lines, the attribute data supply unit 206 supplies the values of the pixels (63, 22) to (79, 22) in the moving area map. For combining of the 31st to 34th lines, the attribute data supply unit 206 supplies the values of the pixels (63, 23) to (79, 23) in the moving area map. For combining of the 35th to 38th lines, the attribute data supply unit 206 supplies the values of the pixels (63, 24) to (79, 24) in the moving area map. For combining of the 39th to 42nd lines, the attribute data supply unit 206 supplies the values of the pixels (63, 25) to (79, 25) in the moving area map. For combining of the 43rd to 46th lines, the attribute data supply unit 206 supplies the values of the pixels (63, 26) to (79, 26) in the moving area map. For combining of the 47th to 50th lines, the attribute data supply unit 206 supplies the values of the pixels (63, 27) to (79, 27) in the moving area map. For combining of the 51st to 54th lines, the attribute data supply unit 206 supplies the values of the pixels (63, 28) to (79, 28) in the moving area map. For combining of the 55th to 58th lines, the attribute data supply unit 206 supplies the values of the pixels (63, 29) to (79, 29) in the moving area map. For combining of the 59th to 62nd lines, the attribute data supply unit 206 supplies the values of the pixels (63, 30) to (79, 30) in the moving area map. For combining of the 63rd to 64th lines, the attribute data supply unit 206 supplies the values of the pixels (63, 31) to (79, 31) in the moving area map. The rectangles #10 to #14, the rectangles #15 to #19, the rectangles #20 to #24, and the rectangles #25 to #29 are also processed in a similar manner to the rectangles #6 to #9.

Figure 15:
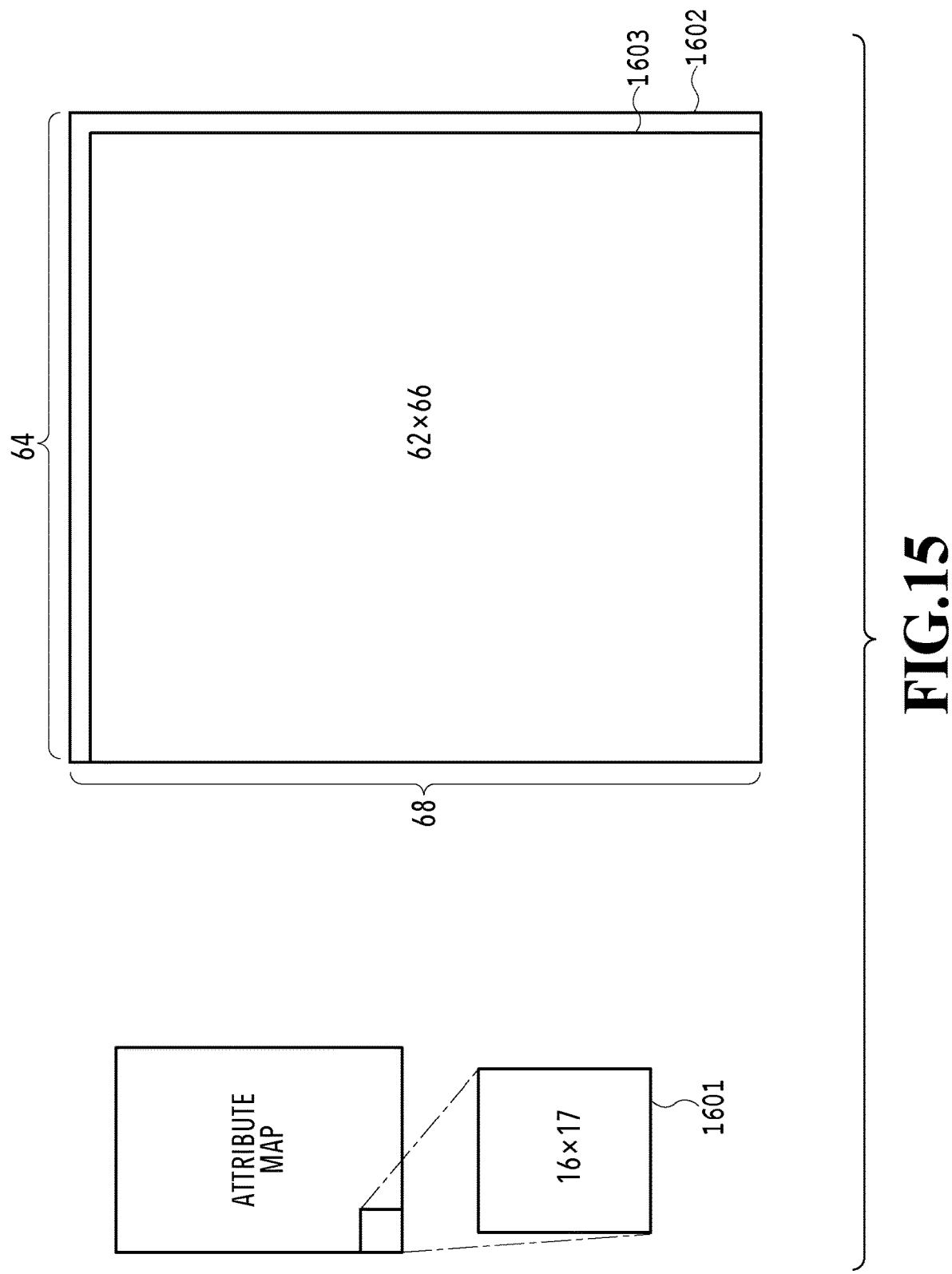
FIG. 15 is a diagram for explaining the relation between a rectangular area read out from the attribute map and pixels to be supplied to the image combining unit.

In the case where the image combining unit 208 combines the rectangle #30 illustrated in FIG. 4, the attribute data supply unit 206 reads out the pixels (0, 95) to (15, 111), (0, 95) to (15, 111), . . . , (0, 95) to (15, 111) in the moving area map. FIG. 15 is a diagram for explaining the relation between a rectangular area read out from the moving area map (the rectangular area corresponding to the rectangle #30) and pixels to be supplied to the image combining unit 208. A rectangular area 1601 is a rectangular area with 16×17 pixels read out from the moving area map. A rectangular area 1602 is a rectangular area obtained by enlarging the rectangular area 1601 four times in both height and width, which corresponds to the reduction ratio. A rectangular area 1603 represents a rectangular area with 62×66 pixels to be supplied to the image combining unit 208 within the enlarged rectangular area 1602. In other words, the pixel values of the rectangular area 1603 are supplied as moving area attribute data to the image combining unit 208. An operation example in which the attribute data supply unit 206 supplies moving area attribute data from a rectangular area in the moving area map (the rectangular area corresponding to the rectangle #30) will be presented below.

For combining of the first to second lines in the rectangle #30, the attribute data supply unit 206 repetitively supplies the values of the pixels (0, 95) to (14, 95) in the moving area map four times each to the image combining unit 208, and then supplies the value of the pixel (15, 95) twice to the image combining unit 208. For combining of the third to sixth lines, the attribute data supply unit 206 repetitively supplies the values of the pixels (0, 96) to (14, 96) in the moving area map four times each to the image combining unit 208, and then supplies the value of the pixel (15, 96)

twice to the image combining unit 208. Subsequently, in a similar manner, for combining of the 7th to 10th lines, the attribute data supply unit 206 supplies the values of the pixels (0, 97) to (15, 97) in the moving area map. For combining of the 11th to 14th lines, the attribute data supply unit 206 supplies the values of the pixels (0, 98) to (15, 98) in the moving area map. For combining of the 15th to 18th lines, the attribute data supply unit 206 supplies the values of the pixels (0, 99) to (15, 99) in the moving area map. For combining of the 19th to 22nd lines, the attribute data supply unit 206 supplies the values of the pixels (0, 100) to (15, 100) in the moving area map. For combining of the 23rd to 26th lines, the attribute data supply unit 206 supplies the values of the pixels (0, 101) to (15, 101) in the moving area map. For combining of the 27th to 30th lines, the attribute data supply unit 206 supplies the values of the pixels (0, 102) to (15, 102) in the moving area map. For combining of the 31st to 34th lines, the attribute data supply unit 206 supplies the values of the pixels (0, 103) to (15, 103) in the moving area map. For combining of the 35th to 38th lines, the attribute data supply unit 206 supplies the values of the pixels (0, 104) to (15, 104) in the moving area map. For combining of the 39th to 42nd lines, the attribute data supply unit 206 supplies the values of the pixels (0, 105) to (15, 105) in the moving area map. For combining of the 43rd to 46th lines, the attribute data supply unit 206 supplies the values of the pixels (0, 106) to (15, 106) in the moving area map. For combining of the 47th to 50th lines, the attribute data supply unit 206 supplies the values of the pixels (0, 107) to (15, 107) in the moving area map. For combining of the 51st to 54th lines, the attribute data supply unit 206 supplies the values of the pixels (0, 108) to (15, 108) in the moving area map. For combining of the 55th to 58th lines, the attribute data supply unit 206 supplies the values of the pixels (0, 109) to (15, 109) in the moving area map. For combining of the 59th to 62nd lines, the attribute data supply unit 206 supplies the values of the pixels (0, 110) to (15, 110) in the moving area map. For combining of the 63rd to 66th lines, the attribute data supply unit 206 supplies the values of the pixels (0, 111) to (15, 111) in the moving area map.

Figure 16:
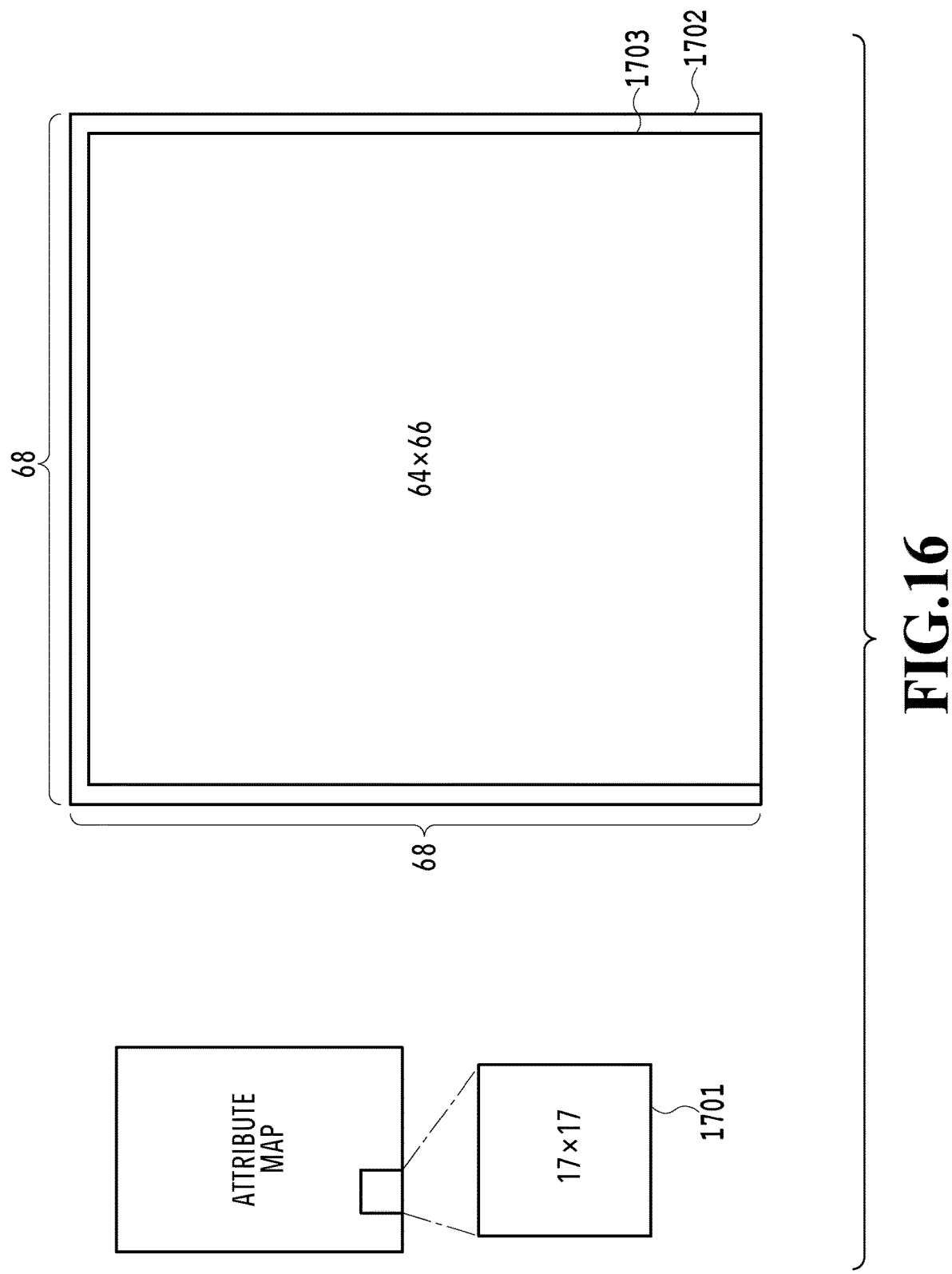
FIG. 16 is a diagram for explaining the relation between a rectangular area read out from the attribute map and pixels to be supplied to the image combining unit.

In the case where the image combining unit 208 combines the rectangle #31 illustrated in FIG. 4, the attribute data supply unit 206 reads out the pixels (15, 95) to (31, 95), (15, 96) to (31, 96), . . . , (15, 111) to (31, 111) in the moving area map. FIG. 16 is a diagram for explaining the relation between a rectangular area read out from the moving area map (the rectangular area corresponding to the rectangle #31) and pixels to be supplied to the image combining unit 208. A rectangular area 1701 is a rectangular area with 17×17 pixels read out from the moving area map. A rectangular area 1702 is a rectangular area obtained by enlarging the rectangular area 1701 four times in both height and width, which corresponds to the reduction ratio. A rectangular area 1703 represents a rectangular area with 64×66 pixels to be supplied to the image combining unit 208 within the enlarged rectangular area 1702. In other words, the pixel values of the rectangular area 1703 are supplied as moving area attribute data to the image combining unit 208. An operation example in which the attribute data supply unit 206 supplies moving area attribute data from a rectangular area in the moving area map (the rectangular area corresponding to the rectangle #31) will be presented below.

For combining of the first to second lines in the rectangle #31, the attribute data supply unit 206 repetitively supplies the value of the pixel (15, 95) in the moving area map twice to the image combining unit 208. Further, the attribute data supply unit 206 repetitively supplies the values of the pixels (16, 95) to (30, 95) four times each to the image combining unit 208, and then supplies the value of the pixel (31, 95) twice to the image combining unit 208. For combining of the third to sixth lines, the attribute data supply unit 206 repetitively supplies the value of the pixel (15, 96) in the moving area map twice to the image combining unit 208. Further, the attribute data supply unit 206 repetitively supplies the values of the pixels (16, 96) to (30, 96) four times each to the image combining unit 208, and then supplies the value of the pixel (31, 96) twice to the image combining unit 208. Subsequently, in a similar manner, for combining of the 7th to 10th lines, the attribute data supply unit 206 supplies the values of the pixels (15, 97) to (31, 97) in the moving area map. For combining of the 11th to 14th lines, the attribute data supply unit 206 supplies the values of the pixels (15, 98) to (31, 98) in the moving area map. For combining of the 15th to 18th lines, the attribute data supply unit 206 supplies the values of the pixels (15, 99) to (31, 99) in the moving area map. For combining of the 19th to 22nd lines, the attribute data supply unit 206 supplies the values of the pixels (15, 100) to (31, 100) in the moving area map. For combining of the 23rd to 26th lines, the attribute data supply unit 206 supplies the values of the pixels (15, 101) to (31, 101) in the moving area map. For combining of the 27th to 30th lines, the attribute data supply unit 206 supplies the values of the pixels (15, 102) to (31, 102) in the moving area map. For combining of the 31st to 34th lines, the attribute data supply unit 206 supplies the values of the pixels (15, 103) to (31, 103) in the moving area map. For combining of the 35th to 38th lines, the attribute data supply unit 206 supplies the values of the pixels (15, 104) to (31, 104) in the moving area map. For combining of the 39th to 42nd lines, the attribute data supply unit 206 supplies the values of the pixels (15, 105) to (31, 105) in the moving area map. For combining of the 43rd to 46th lines, the attribute data supply unit 206 supplies the values of the pixels (15, 106) to (31, 106) in the moving area map. For combining of the 47th to 50th lines, the attribute data supply unit 206 supplies the values of the pixels (15, 107) to (31, 107) in the moving area map. For combining of the 51st to 54th lines, the attribute data supply unit 206 supplies the values of the pixels (15, 108) to (31, 108) in the moving area map. For combining of the 55th to 58th lines, the attribute data supply unit 206 supplies the values of the pixels (15, 109) to (31, 109) in the moving area map. For combining of the 59th to 62nd lines, the attribute data supply unit 206 supplies the values of the pixels (15, 110) to (31, 110) in the moving area map. For combining of the 63rd to 66th lines, the attribute data supply unit 206 supplies the values of the pixels (15, 111) to (31, 111) in the moving area map. The rectangles #32 and #33 are also processed in a similar manner to the rectangle #31.

Figure 17:
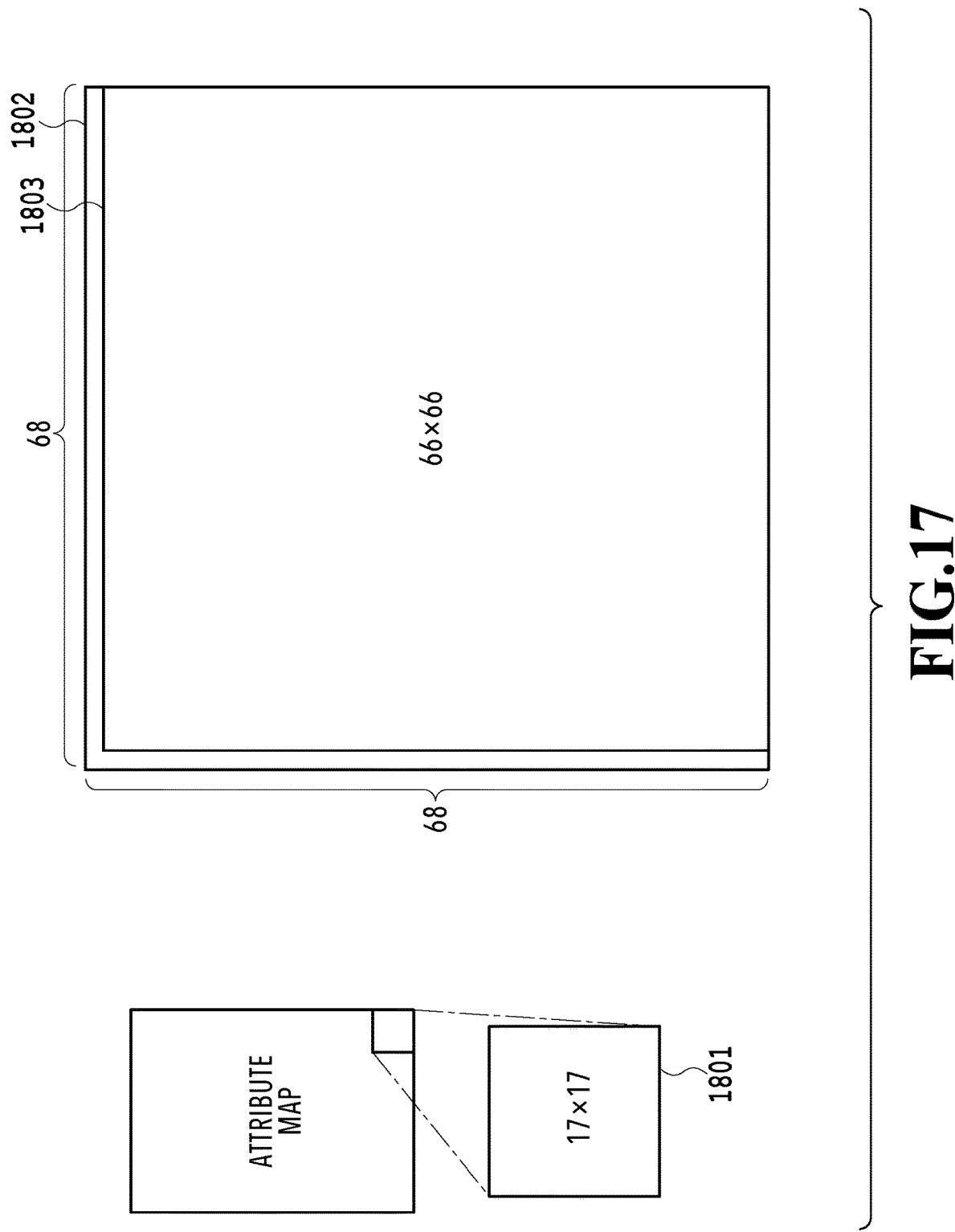
FIG. 17 is a diagram for explaining the relation between a rectangular area read out from the attribute map and pixels to be supplied to the image combining unit.

In the case where the image combining unit 208 combines the rectangle #34 illustrated in FIG. 4, the attribute data supply unit 206 reads out the pixels (63, 95) to (79, 95), (63, 96) to (79, 96), . . . , (63, 111) to (79, 111) in the moving area map. FIG. 17 is a diagram for explaining the relation between a rectangular area read out from the moving area map (the rectangular area corresponding to the rectangle #34) and pixels to be supplied to the image combining unit 208. A rectangular area 1801 is a rectangular area with 17×17 pixels read out from the moving area map. A rectangular area 1802 is a rectangular area obtained by enlarging the rectangular area 1801 four times in both height and width, which corresponds to the reduction ratio. A rectangular area 1803 represents a rectangular area with 66×66 pixels to be supplied to the image combining unit 208 within the enlarged rectangular area 1802. In other words, the pixel values of the rectangular area 1803 are supplied as moving area attribute data to the image combining unit 208. An operation example in which the attribute data supply unit 206 supplies moving area attribute data from a rectangular area in the moving area map (the rectangular area corresponding to the rectangle #34) will be presented below.

For combining of the first to second lines in the rectangle #34, the attribute data supply unit 206 repetitively supplies the value of the pixel (63, 95) in the moving area map twice to the image combining unit 208 and repetitively supplies the values of the pixels (64, 95) to (79, 95) four times each to the image combining unit 208. For combining of the third to sixth lines, the attribute data supply unit 206 repetitively supplies the value of the pixel (63, 96) in the moving area map twice to the image combining unit 208 and repetitively supplies the values of the pixels (64, 96) to (79, 96) four times each to the image combining unit 208. Subsequently, in a similar manner, for combining of the 7th to 10th lines, the attribute data supply unit 206 supplies the values of the pixels (63, 97) to (79, 97) in the moving area map. For combining of the 11th to 14th lines, the attribute data supply unit 206 supplies the values of the pixels (63, 98) to (79, 98) in the moving area map. For combining of the 15th to 18th lines, the attribute data supply unit 206 supplies the values of the pixels (63, 99) to (79, 99) in the moving area map. For combining of the 19th to 22nd lines, the attribute data supply unit 206 supplies the values of the pixels (63, 100) to (79, 100) in the moving area map. For combining of the 23rd to 26th lines, the attribute data supply unit 206 supplies the values of the pixels (63, 101) to (79, 101) in the moving area map. For combining of the 27th to 30th lines, the attribute data supply unit 206 supplies the values of the pixels (63, 102) to (79, 102) in the moving area map. For combining of the 31st to 34th lines, the attribute data supply unit 206 supplies the values of the pixels (63, 103) to (79, 103) in the moving area map. For combining of the 35th to 38th lines, the attribute data supply unit 206 supplies the values of the pixels (63, 104) to (79, 104) in the moving area map. For combining of the 39th to 42nd lines, the attribute data supply unit 206 supplies the values of the pixels (63, 105) to (79, 105) in the moving area map. For combining of the 43rd to 46th lines, the attribute data supply unit 206 supplies the values of the pixels (63, 106) to (79, 106) in the moving area map. For combining of the 47th to 50th lines, the attribute data supply unit 206 supplies the values of the pixels (63, 107) to (79, 107) in the moving area map. For combining of the 51st to 54th lines, the attribute data supply unit 206 supplies the values of the pixels (63, 108) to (79, 108) in the moving area map. For combining of the 55th to 58th lines, the attribute data supply unit 206 supplies the values of the pixels (63, 109) to (79, 109) in the moving area map. For combining of the 59th to 62nd lines, the attribute data supply unit 206 supplies the values of the pixels (63, 110) to (79, 110) in the moving area map. For combining of the 63rd to 66th lines, the attribute data supply unit 206 supplies the values of the pixels (63, 111) to (79, 111) in the moving area map.

As described above, the attribute data supply unit 206 enlarges the moving area map and supplies the moving area attribute data corresponding to the rectangular areas in the combining target images after the filter process to the image combining unit 208.

For each pixel with moving area attribute data representing a moving area, the image combining unit 208 outputs the pixel in the short exposure image to the image data transfer unit 209 as the combining result. Also, for each pixel with moving area attribute data representing a non-moving area, the image combining unit 208 outputs a value obtained by processing the pixel in the short exposure image and the pixel in the long exposure image in accordance with a predetermined calculation equation to the image data transfer unit 209 as the combining result. The image data transfer unit 209 transfers the image data combined by the image combining unit 208 to a predetermined address in the RAM 102.

A display driver is connected to the image output unit 107 and further a display is connected to the display driver. The image output unit 107 reads out the image data combined by the image processing unit 106, which is stored in the RAM 102, and transfers it to the display driver. The display driver processes the transferred image data and outputs the processed image data to the display. As a result, an HDR image, obtained by combining the short exposure image and the long exposure image, is displayed on the display.

As described above, in this embodiment, the pixel order in which the pixel values are input to the filtering process and the block unit are different from the pixel order or block unit in which the filtering process result is output to the image combining unit 208. Therefore, after enlarging the reduced moving area map, pixels in the moving area map are supplied to the image combining unit 208 based on the position and size of the block area in the processing target images after the filter process in the entire images. As a result, the pixels of the attribute map can be read out in the same pixel order and block unit as the pixel order or block unit outputted to the image combining unit 208, and supplied to the image combining unit 208. Thus, even in the case where the size of the block areas in the processing target images changes depending on their positions in the entire images due to the filter process, it is still possible to ensure proper correspondence between the pixels in the processing target images and the pixels in the attribute map. This makes it possible to perform proper image combining even in the case where the filter process is executed on the processing target images divided into blocks. This also eliminates the need to make adjacent block areas overlap each other or to provide a memory for a plurality of lines, and thereby prevents the product cost from increasing more than necessary. Also, in this embodiment, the attribute data supply unit 206 holds the filter information reflecting the method of the filter process performed by the filter unit 207 in the register 801. Thus, even in the case where the method of the filter process is changed, the attribute data supply unit 206 can ensure correspondence between the pixels in the processing target images and the pixels in the attribute map by setting appropriate values in the register 801.

Note that the attribute data supply unit 206 is also applicable to image processing that combines three or more images differing in duration of exposure. Also, the image processing is not limited to combining but may be any image processing that processes a plurality of images. Also, the attribute data supply unit 206 may be used not only to supply the attribute map but also to supply any images that are not subjected to the filter process. Also, in this embodiment, the image reduction unit 202 is provided to generate a moving area map from processing target images reduced in size to ¼ in both height and width, in order to reduce the memory consumption. However, the image processing apparatus may not include the image reduction unit 202. Also, this embodiment has been based on the example where the processing target images are partitioned into rectangular areas and supplied to the filter unit 207. However, the processing target images may be partitioned into non-rectangular block areas and supplied to the filter unit 207. Also, for simple description, this embodiment has been described by taking the example where the image data read unit 205 does not perform geometric transformation on the processing target images. However, in the case where the image data read unit 205 performs geometric transformation on the processing target images, values corresponding to the geometric transformation performed on the processing target images may be set as the attribute map geometric transformation parameter in the register 801. Then, the attribute data supply unit 206 may perform the geometric transformation on the attribute data to be supplied to the image combining unit 208 (e.g., the pixels in the rectangular area 1003, illustrated in FIG. 9) based on this attribute map geometric transformation parameter.

Second Embodiment

In this embodiment, an example will be presented in which, in the case of combining a plurality of images, the image combining unit 208 performs the combining while changing a parameter in particular among high-luminance areas, low-luminance areas, and other areas. For example, the image combining unit 208 increases the ratio of combining of the short exposure image for high-luminance areas (e.g., areas with a luminance above a predetermined upper limit threshold), while increasing the ratio of combining of the long exposure image for low-luminance areas (e.g., areas with a luminance below a predetermined lower limit threshold).

A luminance map is necessary in order for the image combining unit 208 to change the processing between high-luminance areas and low-luminance areas. Thus, the attribute data supply unit 206 supplies a moving area map and a luminance map to the image combining unit 208.

Here, assume that a moving area map with 112 pixels in height by 80 pixels in width and a luminance map with 112 pixels in height by 80 pixels in width are generated for images with 448 pixels in height by 320 pixels in width. In this case, the register 801 of the attribute data supply unit 206 is set as follows, for example: the number of rectangles in the width direction=5, the number of rectangles in the height direction=7, the left-end rectangle width=62, the middle rectangle width=64, the right-end rectangle width=66, the upper-end rectangle height=62, middle rectangle height=64, the lower-end rectangle height=66, the first attribute map enablement=1 (1 represents being enabled), the first attribute map geometric transformation parameter= (a:4, b:0, c:0, d:4), the first attribute map address=the head address of the moving area map, the second attribute map enablement=1 (1 represents being enabled), the second attribute map geometric transformation parameter=(a:4, b:0, c:0, d:4), and the second attribute map address=the head address of the luminance map. Based on the above register set values, the attribute data supply unit 206 counts the rectangle position in the width direction and the height direction and the pixel position in the rectangle in the width direction and the height direction and supplies moving area attribute data, as in the first embodiment, and luminance attribute data to the image combining unit 208.

Note that the reduction ratio of the moving area map and the reduction ration of the luminance map may be mutually different values.

Third Embodiment

In the first embodiment, the example in which the image processing unit 106 (in particular the image combining unit 208) combines a long exposure image and a short exposure image has been presented. However, the image processing unit 106 may perform other image processing. For example, the image processing unit 106 may perform image correction on the input images. Thus, in this embodiment, an image processing apparatus in which its image processing unit 106 corrects the pixel values of dark portions by referring a luminance map will be presented as an example.

The configuration of the image processing apparatus according to this embodiment is similar to the first embodiment. However, the image analysis unit 105 includes a luminance map generation unit (not shown schematically) in place of the moving area attribute generation unit 204. Moreover, the image processing unit 106 includes an image correction unit (not shown schematically) in place of the image combining unit 208. In the image processing apparatus according to this embodiment, the attribute data supply unit 206 supplies a luminance map, in place of the moving area map, received from the luminance map generation unit to the image correction unit for each rectangular area basis. In doing so, the attribute data supply unit 206 supplies the luminance map to the image correction unit for each rectangular area based on the filter information, as in the case of supplying a moving area map. The image correction unit refers to the luminance map for each rectangular area, supplied from the attribute data supply unit 206, and corrects the pixel values of dark portions. Specifically, the image correction unit corrects the pixel values of areas with a luminance at or below a predetermined threshold to a higher luminance. For example, the image correction unit corrects the luminance of areas with a luminance at or below the predetermined threshold to a value larger than the predetermined threshold.

Fourth Embodiment

In the first embodiment, an image processing apparatus that processes processing target images on which a filter process has been executed based on an attribute map has been presented as an example. However, some embodiments are also applicable to an image processing apparatus that performs an image generation process using a processing target image on which a filter process has been executed and the processing target image before the filter process to newly generate an image different from both images. Thus, in this embodiment, an image processing apparatus in which its image processing unit 106 inputs a processing target image before a filter process in place of an attribute map will be presented as an example.

Figure 18:
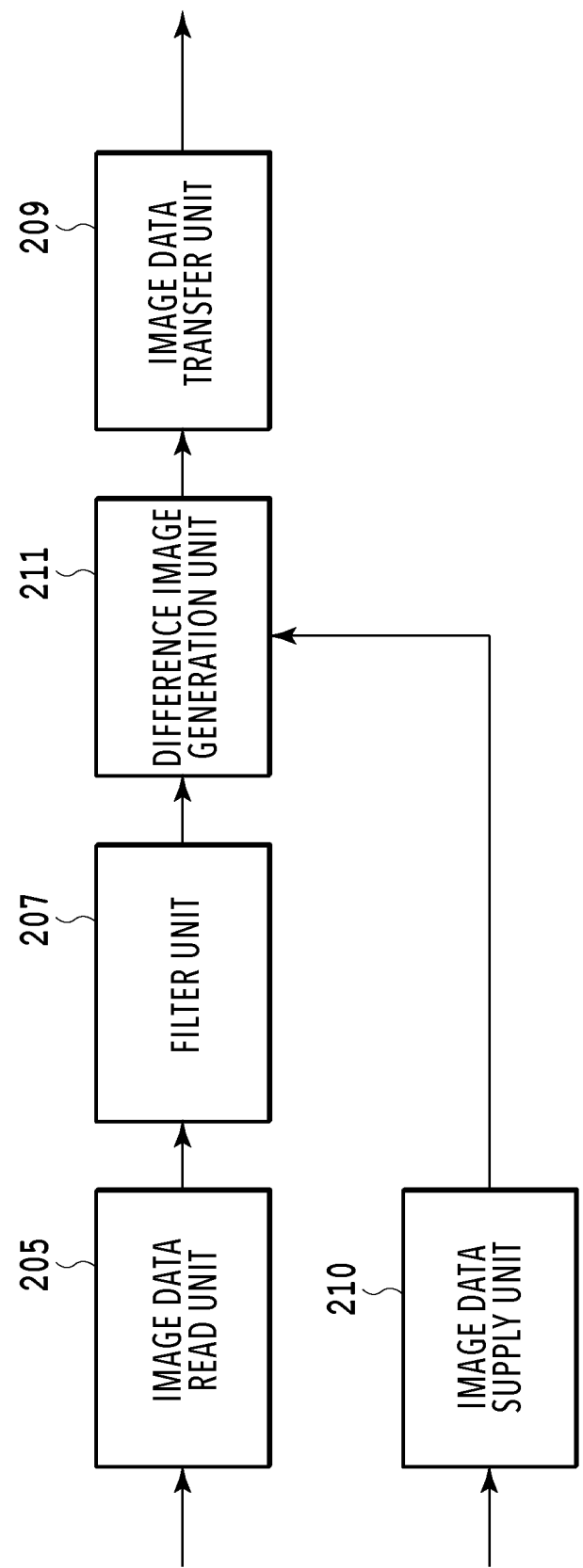
FIG. 18 is a block diagram illustrating the configuration of an image processing unit of an image processing apparatus according to a fourth embodiment.

FIG. 18 is a block diagram illustrating the configuration of the image processing unit of the image processing apparatus according to the fourth embodiment. In this embodiment, as illustrated in FIG. 18, the image processing unit includes an image data supply unit 210 in place of the attribute data supply unit 206. The image processing unit also includes a difference image generation unit 211 in place of the image combining unit 208. Note that since the image processing unit does not input attribute data in this embodiment, the image processing apparatus according to this embodiment may not include the image analysis unit 105. The image data supply unit 210 reads image data from the image input unit 104, like the image data read unit 205. In other words, the image data read by the image data supply unit 210 and the image data read by the image data read unit 205 are the same. Also, the configuration of the image data supply unit 210 is similar to the configuration of the attribute data supply unit 206. In other words, the image data supply unit 210 operates similarly to the attribute data supply unit 206 except that the data read is image data. The difference image generation unit 211 compares the image on which the filter process has been executed supplied from the filter unit 207 and the image on which the filter process has not been executed supplied from the image data supply unit 210 on a rectangle-by-rectangle basis to thereby generate a difference image for each pixel.

Note that the image processing unit 106 may further include a filter control unit (not shown schematically). Further, the filter control unit may calculate a filter coefficient based on the difference image, generated by the difference image generation unit 211, and set the calculated filter coefficient to the filter unit 207. For example, the filter control unit may accumulate difference images generated on a rectangle-by-rectangle basis for one screen, calculate a filter coefficient for processing the next screen from the difference images for the one screen, and set the calculated filter coefficient to the filter unit 207 before processing the next screen.

Fifth Embodiment

In the first embodiment, an image processing apparatus that performs block division and a filter process as preprocessing of image combining has been presented as an example. In this embodiment, on the other hand, an image processing apparatus that performs geometric transformation as preprocessing of the image combining will be presented as an example.

The image processing apparatus in this embodiment inputs short exposure images and long exposure images captured by switching the duration of exposure by every frame (1/60 seconds). Then, the image processing apparatus compares images of two frames differing in time. In this embodiment, the image processing apparatus compares the short exposure image of the current frame and the short exposure image of the last as the images of the two frames differing in time. Here, the last frame refers to the frame immediately preceding the current frame. Further, the image processing apparatus geometrically transforms the short exposure image and the long exposure image of the current frame based on a geometric transformation parameter obtained by the comparison to thereby remove distortion due to vibration such as camera shake. Then, the image processing apparatus performs image combining on the geometrically transformed short exposure image and the long exposure image of the current frame to thereby generate an HDR image having a wide dynamic range. Thereafter, the image processing apparatus outputs the generated HDR image to the display or the like.

An advantageous effect of this embodiment will be described first. In moving image processing that performs HDR combining, geometric transformation is sometimes performed on the input images (captured images) to remove distortion due to vibration such as camera shake. In the case of performing geometric transformation on the captured images, it is necessary to avoid disarranging the correspondence between the pixels in the captured images after the geometric transformation and the pixels in the moving area map. To this end, usually, the image processing apparatus firstly detects motion vectors from the captured images to thereby calculate a geometric transformation parameter and geometrically transforms the captured images. Then, the image processing apparatus uses the geometrically transformed captured images to detect motion vectors and generates a moving area map. However, since the motion vector detection involves performing a process in which temporally continuous image frames are compared with each other, a processing delay occurs at a frame level. In the case where motion vector detection is performed individually for the image geometric transformation and the moving area map generation, it means that the motion vector detection is performed twice, which increases the processing delay and is therefore not preferable. In contrast, in this embodiment, image geometric transformation and moving area map generation are performed in parallel by using the result of motion vector detection performed on the captured images. While the moving area map generation is performed, the images are geometrically transformed. Thus, the positional correspondence between the images and the moving area map will be disarranged if no measure is taken. To avoid this, after the moving area map generation, the geometric transformation parameter is used to geometrically transform the moving area map in accordance with the captured images and thereby ensure correspondence between the pixels in the images and the pixels in the moving area map. In this way, the number of times motion vector detection is performed can be reduced to once and the processing delay can be shortened accordingly.

The image processing apparatus in this embodiment includes an image analysis unit 115 in place of the image analysis unit 105 in the first embodiment. The image processing apparatus in this embodiment also includes an image processing unit 116 in place of the image processing unit 106 in the first embodiment.

Figure 19:
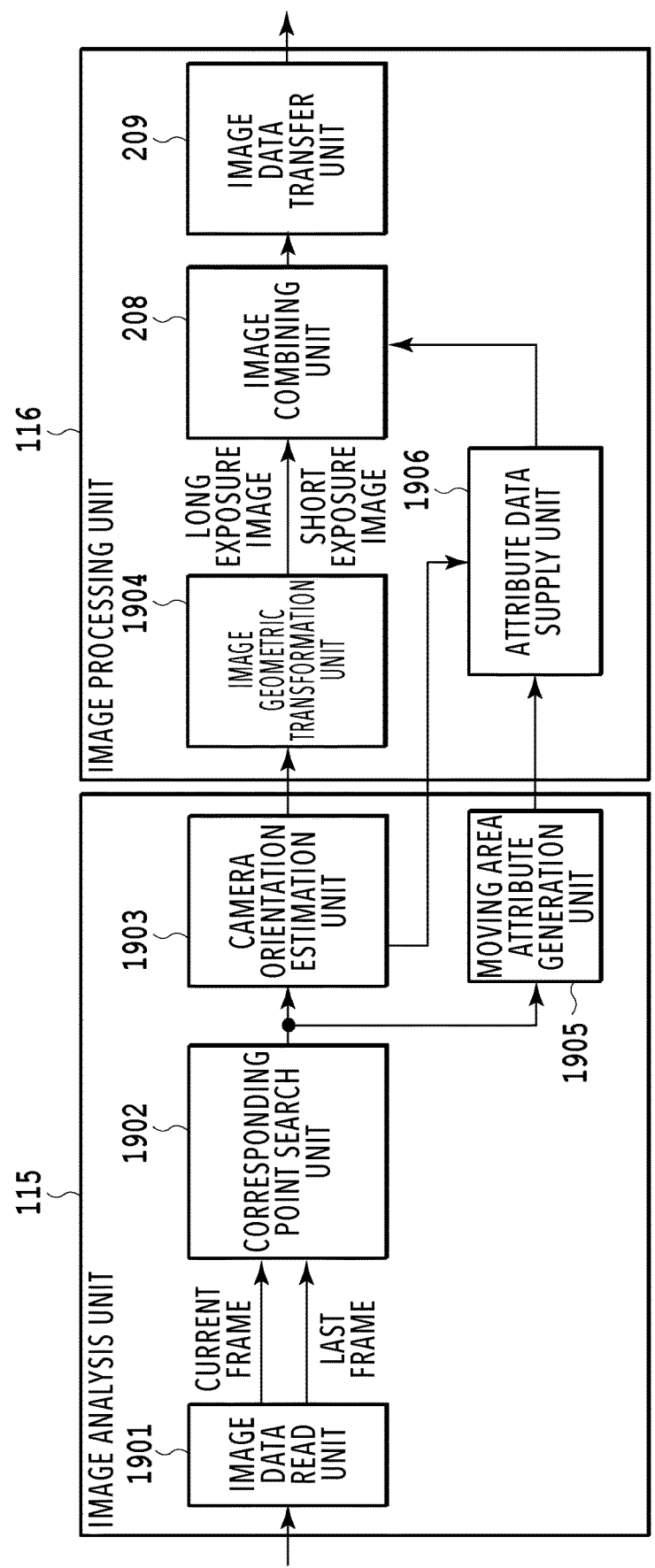
FIG. 19 is a block diagram illustrating the configurations of an image analysis unit and an image processing unit in a fifth embodiment.

FIG. 19 is a block diagram illustrating the configurations of the image analysis unit 115 and the image processing unit 116 in the fifth embodiment. The image analysis unit 115 reads images of two frames differing in time and performs a corresponding point search. In this embodiment, the image analysis unit 115 reads the short exposure image of the current frame and the short exposure image of the last frame as the images of the two frames differing in time, as mentioned above, and performs a corresponding point search. Based on the corresponding point search, the image analysis unit 115 generates a geometric transformation parameter based on a change in camera orientation occurring between the points in the case where these images were captured, and an attribute map representing a moving subject(s). The image analysis unit 115 outputs the generated geometric transformation parameter and attribute map to the image processing unit 116. The image processing unit 116 geometrically transforms the short exposure image and the long exposure image of the current frame in accordance with the geometric transformation parameter input from the image analysis unit 115 to thereby remove the distortion due to camera shake. Moreover, the image processing unit 116 performs a combining process on the short exposure image and the long exposure image of the current frame in accordance with the attribute map and outputs a single HDR image.

Details of the image analysis unit 115 and the image processing unit 116 will now be described. The image analysis unit 115 includes an image data read unit 1901, a corresponding point search unit 1902, a camera orientation estimation unit 1903, and a moving area attribute generation unit 1905. The image processing unit 116 includes an image geometric transformation unit 1904, an attribute data supply unit 1906, the image combining unit 208, and the image data transfer unit 209.

The image data read unit 1901 reads out images of two frames differing in time from the RAM 102 and supplies them to the corresponding point search unit 1902.

The corresponding point search unit 1902 extracts characteristic points from the images of the two frames differing in time, matching these characteristic points between the images, and outputs the positional correspondences between the characteristic points as motion vectors.

The camera orientation estimation unit 1903 calculates a geometric transformation parameter from the plurality of motion vectors calculated by the corresponding point search unit 1902. In this example, a motion parameter (homography matrix) based on the change in camera orientation occurring between the points in the case where the images of the two frames differing in time were captured is calculated as the geometric transformation parameter. Here, the motion vectors include the motion of a moving subject(s) besides the motion resulting from the change in camera orientation. Thus, the camera orientation estimation unit 1903 estimates only the motion resulting from the change in camera orientation by using a robust estimation method, such as RANSAC or M estimation. Specifically, the camera orientation estimation unit 1903 randomly selects four pairs of characteristic points, which are necessary for calculation of a homography matrix, and solves a system of equations from the coordinates of the selected characteristic points to calculate a homography matrix. The camera orientation estimation unit 1903 applies the calculated homography matrix to the positional correspondences between the other characteristic points to calculate the errors. Using the same procedure, the camera orientation estimation unit 1903 repeats the selection of pairs of characteristic points, the calculation of a homography matrix, and the calculation of errors a predetermined number of times. Finally, the camera orientation estimation unit 1903 outputs the homography matrix with the least errors.

The image geometric transformation unit 1904 geometrically transforms the short exposure image and the long exposure image of the current frame based on the homography matrix calculated by the camera orientation estimation unit 1903 and supplies them to the image combining unit 208.

The moving area attribute generation unit 1905 generates a moving area map from the plurality of motion vectors calculated by the corresponding point search unit 1902. The moving area map is a multivalued attribute map representing a moving subject area(s). The operation of the moving area attribute generation unit 1905 will now be described.

Figure 20A:
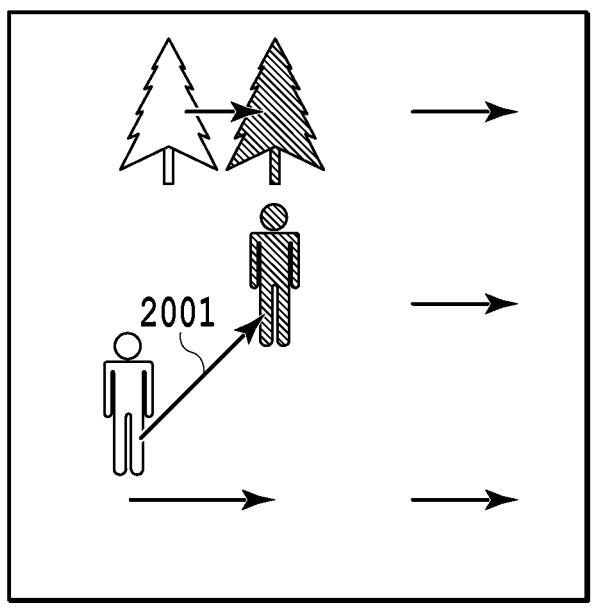
FIG. 20A is a diagram for explaining the operation of a moving area attribute generation unit in the fifth embodiment.
Figure 20B:
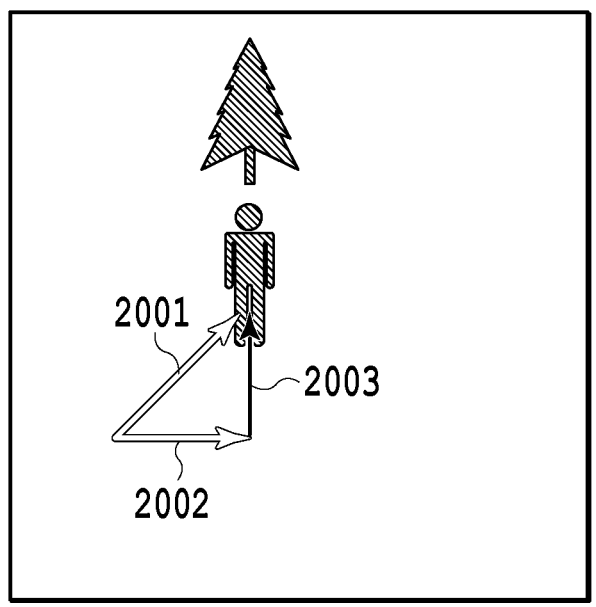
FIG. 20B is a diagram for explaining the operation of the moving area attribute generation unit in the fifth embodiment.
Figure 20C:
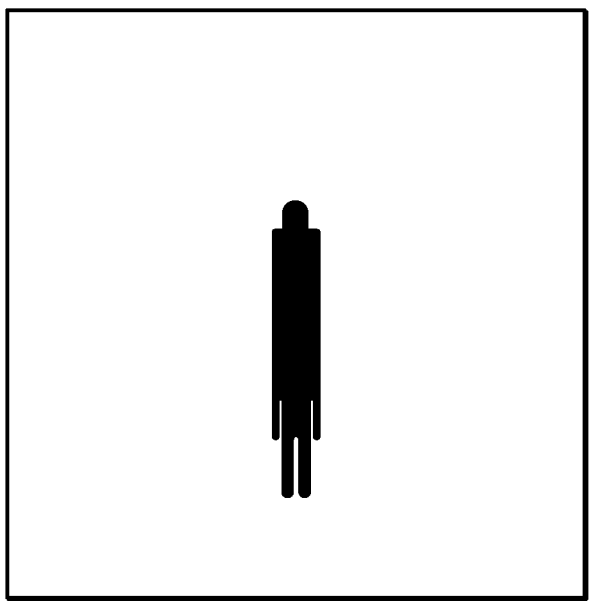
FIG. 20C is a diagram for explaining the operation of the moving area attribute generation unit in the fifth embodiment.

FIGS. 20A to 20C are diagrams for explaining the operation of the moving area attribute generation unit 1905 in the fifth embodiment. FIG. 20A schematically illustrates motion vectors calculated by the corresponding point search unit 1902. The arrows illustrated in FIG. 20A represent the motion vectors. As illustrated in FIG. 20A, the motion vectors include the motion of a moving subject and the motions resulting from a change in camera orientation. In the example illustrated in FIG. 20A, the moving subject is a person and is moving from the lower side of the screen toward the upper side. Also, due to the change in camera orientation, the objects in the entire screen are moving from the left side toward the right side. FIG. 20B illustrates how a motion vector 2003 of the moving subject is detected from a motion vector 2001 containing the motion of the moving subject and the motion resulting from the change in camera orientation. The moving area attribute generation unit 1905 subtracts a motion vector 2002 equivalent to the change in camera orientation from the motion vector 2001 and detects the motion vector after the subtraction as the motion vector 2003 of the moving subject. In this example, the motion vector 2002 is the motion vector that appears the most among the motion vectors illustrated in FIG. 20A. In this embodiment, the moving area attribute generation unit 1905 assumes the motion vector 2002 as the motion resulting from the change in camera orientation. The moving area attribute generation unit 1905 maps the absolute value of the motion vector 2003 as a motion amount in a moving area map. FIG. 20C schematically illustrates the moving area map generated from the motion vector 2003, detected in FIG. 20B.

Figure 21A:
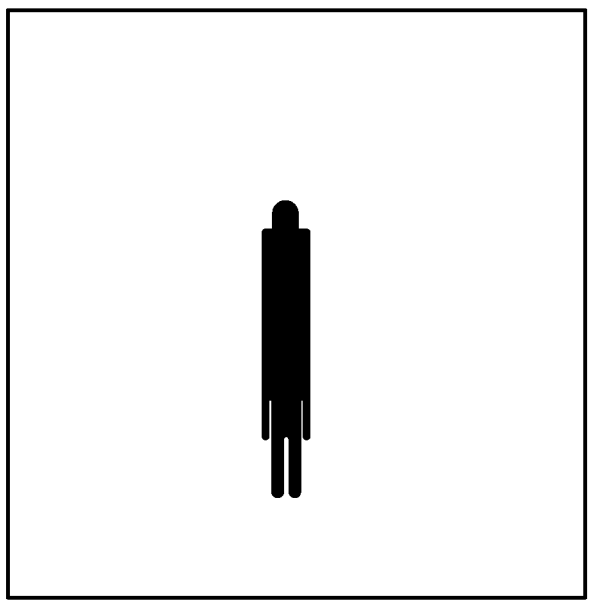
FIG. 21A is a diagram for explaining the operation of an attribute data supply unit in the fifth embodiment.
Figure 21B:
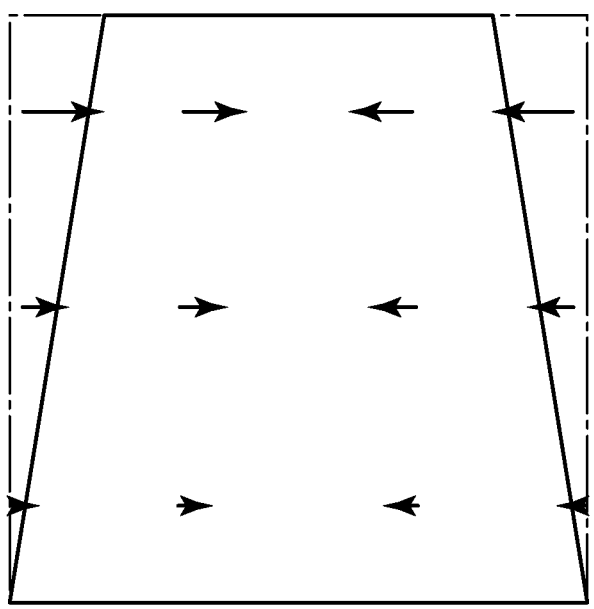
FIG. 21B is a diagram for explaining the operation of the attribute data supply unit in the fifth embodiment.
Figure 21C:
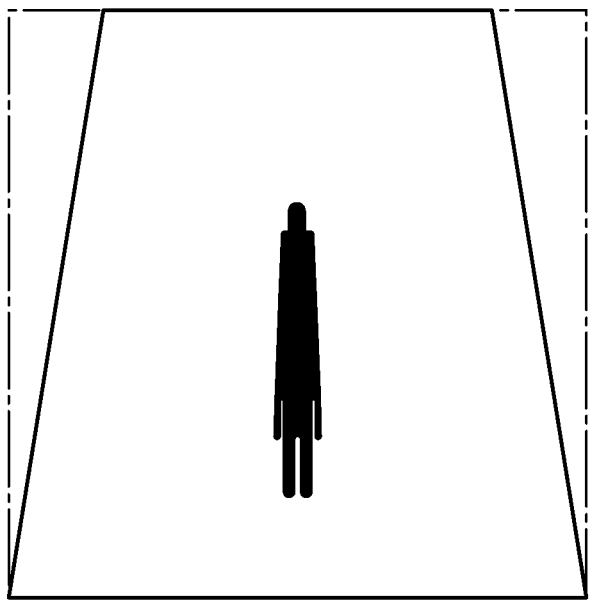
FIG. 21C is a diagram for explaining the operation of the attribute data supply unit in the fifth embodiment.

The attribute data supply unit 1906 has a configuration similar to the configuration of the attribute data supply unit 206 in the first embodiment. However, the attribute data supply unit 1906 differs from the attribute data supply unit 206 in that the attribute data supply unit 1906 performs geometric transformation on the moving area map by using an attribute map geometric transformation unit. In this embodiment, the register of the attribute data supply unit 1906 is set as follows: the attribute map enablement=1 (1 represents being enabled), the attribute map geometric transformation parameter=the homography matrix generated by the camera orientation estimation unit 1903, and the attribute map address=the head address of the moving area map. Based on the above register set values, the attribute data supply unit 1906 accurately geometrically transforms the moving area map generated by the moving area attribute generation unit 1905 with the geometric transformation parameter (homography matrix) calculated by the camera orientation estimation unit 1903 to make the moving area map correspond to the processing target image. FIGS. 21A to 21C are diagrams for explaining the operation of the attribute data supply unit 1906 in the fifth embodiment. FIG. 21A schematically illustrates the moving area map generated by the moving area attribute generation unit 1905. FIG. 21B schematically illustrates the geometric transformation amounts of the geometric transformation performed on the moving area map. The lengths of the arrows illustrated in FIG. 21B indicate the geometric transformation amounts. Each geometric transformation amount is the difference between the motion amount indicated by the motion parameter (homography matrix) calculated by the camera orientation estimation unit 1903 and the motion vector 2002, assumed as the change in camera orientation by the moving area attribute generation unit 1905. The motion vector 2002, assumed as the change in camera orientation by the moving area attribute generation unit 1905, is rough in accuracy. For this reason, the moving area map is geometrically transformed by the difference from the motion parameter calculated by the camera orientation estimation unit 1903 to accurately correspond to the images. FIG. 21C schematically illustrates the moving area map after the geometric transformation.

In this embodiment, the image combining unit 208 performs HDR combining on the short exposure image and the long exposure image of the current frame geometrically transformed by the image geometric transformation unit 1904. The HDR combining is performed in accordance with the moving area map supplied from the attribute data supply unit 1906 (i.e., the moving area map that has undergone the geometric transformation and positioning). For each pixel representing a moving area in the moving area map, the image combining unit 208 outputs the short exposure image as the combining result to the image data transfer unit 209. For each pixel representing a stationary area in the moving area map, the image combining unit 208 outputs a value obtained by processing the pixel in the short exposure image and the pixel in the long exposure image in accordance with a predetermined calculation equation as the combining result to the image data transfer unit 209. The image data transfer unit 209 transfers the image data combined by the image combining unit 208 to a predetermined address in the RAM 102.

As described above, even in the case of performing geometric transformation as preprocessing of image combining, it is possible to ensure correspondence between the pixels in the processing target images after the geometric transformation and the pixels in the moving area map. Note that the above description uses the example where the attribute data supply unit 1906 does not perform enlargement of the moving area map and performs only geometric transformation thereon. However, the attribute data supply unit 1906 may perform both enlargement and geometric transformation. In other words, as in the first embodiment, the image analysis unit 115 may include an image reduction unit and a reduced image storage unit. Also, the above description uses the example where the attribute data supply unit 1906 geometrically transforms the entire region of the moving area map generated by the moving area attribute generation unit 1905 and supplies the geometrically transformed moving area map to the image combining unit 208. However, the attribute data supply unit 1906 may read out a part of the moving area map corresponding to a pixel in each captured image in response to a request from the image combining unit 208 and supply it to the image combining unit 208. In that case, the attribute data supply unit 1906 performs inverse transform on the area requested by the image combining unit 208 by using the geometric transformation parameter and reads out and supplies the necessary area of the attribute map. Alternatively, the moving area attribute generation unit 1905 may figure out the part of the moving area map by interpolation computation as necessary.

Also, the above description uses the example where the moving area attribute generation unit 1905 generates the moving area map by assuming the motion vector that appears the most as the motion resulting from the change in camera orientation. However, the moving area attribute generation unit 1905 may assume the average of motion vectors as the motion resulting from the change in camera orientation. In that case, the moving area attribute generation unit 1905 may generate the moving area map by subtracting the average of the motion vectors calculated by the corresponding point search unit 1902 from each of these motion vectors.

Also, the above description uses the example where the image analysis unit 115 compares the short exposure image of the current frame and the short exposure image of the last frame to perform a corresponding point search. However, the image analysis unit 115 may compare the long exposure image of the current frame and the long exposure image of the last frame to perform a corresponding point search.

Also, the above description uses the example where the image processing apparatus inputs two images (a short exposure image and a long exposure image) at every frame. However, the image processing apparatus may input one of a short exposure image and a long exposure image alternately at every frame. In that case, for example, the image analysis unit 115 may compare the short exposure image of the current frame and the long exposure image of the last frame to perform a corresponding point search. Then, the image processing unit 116 may geometrically transform the short exposure image of the current frame based on the geometric transformation parameter generated by the corresponding point search. Thereafter, the image processing unit 116 may generate an HDR image by performing image combining on the long exposure image of the last frame and the geometrically transformed short exposure image of the current frame. In another example, the image analysis unit 115 may compare the long exposure image of the current frame and the short exposure image of the last frame to perform a corresponding point search. Then, the image processing unit 116 may geometrically transform the long exposure image of the current frame based on the geometric transformation parameter generated by the corresponding point search. Thereafter, the image processing unit 116 may generate an HDR image by performing image combining on the short exposure image of the last frame and the geometrically transformed long exposure image of the current frame.

Also, the above description uses the example where the image analysis unit 115 compares an image of the current frame and an image of the last frame as the images of two frames differing in time to perform a corresponding point search. However, the image analysis unit 115 may compare an image of the current frame and an image of a frame preceding the last frame (e.g., the second last frame of the third last frame) as the images of two frames differing in time to perform a corresponding point search.

Other Embodiments

Some embodiment(s) can also be realized by a computer of a system or apparatus that reads out and executes computer-executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash-memory device, a memory card, and the like.

According to some embodiments, in the case where image processing based on an attribute map is applied to an input image, it is possible to enable the image processing based on the attribute map to be properly applied to the input image even if correspondence is lost between the pixels in the input image and the pixels in the attribute map due to processing performed at a preceding stage of the image processing.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

What is claimed is:

1. An image processing apparatus for performing a predetermined image processing for an input image based on an attribute map, the image processing apparatus comprising:
a filter unit configured to execute a filter process on each of block areas in the input image and output a filter processing result of each pixel in the input image;
a supply unit configured to read out attribute information from the attribute map and supply attribute information for each pixel; and
an image processing unit configured to perform the predetermined image processing for the filter processing result output by the filter unit based on the attribute information for each pixel supplied by the supply unit,
wherein the pixel order in which a value of each pixel in the input image is received by the filter unit and the pixel order in which the filter unit outputs the filter processing result of each pixel are different, and
wherein the supply unit supplies the attribute information for each pixel according to the pixel order in which the filter unit outputs the filter processing result.

2. The image processing apparatus according to claim 1, wherein
the supply unit reads out the attribute information from the attribute map in accordance with the filter size of the filter process performed by the filter unit.

3. The image processing apparatus according to claim 1, wherein
the filtering unit executes the filter process for each of a plurality of input images in units of block areas, and
the image processing unit is configured to combine a block area on which the filter process has been executed obtained from the input image among the plurality of input images and a block area on which the filter process has been executed obtained from another one of the input images and located at corresponding positions within the input image, based on the attribute information corresponding to the block area, which are supplied from the supply unit.

4. The image processing apparatus according to claim 1, wherein
the supply unit holds filter information that enables identification of sizes of each of the block areas on which the filter process has been executed and supply attribute information based on a position and size of each of the block areas on which the filter process has been executed within the input image, and
the filter information is information derived in advance based on a method of the filter process executed by the filter unit.

5. The image processing apparatus according to claim 4, wherein the supply unit
counts the number of block areas on which the filter unit has finished executing the filter process by the filter unit, and
identifies the position of each of the block areas on which the filter process has been executed within the input image from the number of block areas in a height direction and the number of block areas in a width direction in the input image and from the counted number of block areas.

6. The image processing apparatus according to claim 3, wherein
the plurality of input images are a long exposure image and a short exposure image input, and the image processing unit performs high-dynamic-range combining that combines the long exposure image and the short exposure image as the predetermined image processing.

7. The image processing apparatus according to claim 6, wherein
a moving area map is used as the attribute map, the moving area map being generated from at least two images among the plurality of input images and indicating whether or not a pixel position belongs to a moving area, and
based on the attribute information supplied from the supply unit, the image processing unit, for a pixel position belonging to the moving area, outputs a pixel value in the short exposure image and, for a pixel position belonging to a stationary area, combines a pixel value in the short exposure image and a pixel value in the long exposure image in accordance with a predetermined calculation equation and outputs the combined value.

8. The image processing apparatus according to claim 7, wherein
a luminance map is used as the attribute map in addition to the moving area map, the luminance map indicating luminance at each of pixel positions in the input images,
from each of the moving area map and the luminance map, the supply unit reads out and supplies pixel values corresponding to each of the block areas on which the filter process has been executed, and
in the high-dynamic-range combining, based on attribute information supplied from the supply unit, the image processing unit sets a ratio of combining between the short exposure image and the long exposure image at each pixel position thereof to a value corresponding to the luminance at the pixel position.

9. The image processing apparatus according to claim 1, wherein
the image processing unit performs correction on the block area on which the filter process has been executed based on attribute information corresponding to the block area, which are supplied from the supply unit as the predetermined image processing.

10. The image processing apparatus according to claim 1, wherein
the image processing unit generates new pixel values of the block area from pixel values of the block area on which the filter process has been executed and the attribute information corresponding to the block area, which are supplied from the supply unit as the predetermined image processing.

11. An image processing method for performing a predetermined image processing for an input image based on an attribute map, the method comprising:
executing, by a filter unit, a filter process on each of block areas in the input image and outputting, by the filter unit, a filter processing result of each pixel in the input image;
reading out attribute information for each pixel from the attribute map; and
performing the predetermined image processing for the filter processing result output by the filter unit based on the attribute information for each pixel,
wherein the pixel order in which a value of each pixel in the input image is received by the filter unit and the pixel order in which the filter processing result of each pixel is output by the filter unit are different.

12. A non-transitory computer-readable storage medium storing a program for causing a computer to perform an image processing method for performing a predetermined image processing for an input image based on an attribute map, the method comprising:
- executing, by a filter unit, a filter process on each of block areas in the input image and outputting, by the filter unit, a filter processing result of each pixel in the input image;
- reading out attribute information for each pixel from the attribute map; and
- performing the predetermined image processing for the filter processing result output by the filter unit based on the attribute information for each pixel,
- wherein the pixel order in which a value of each pixel in the input image is received by the filter unit and the pixel order in which the filter processing result of each pixel is output by the filter unit are different.

* * * * *